US012375697B2

(12) United States Patent
Choi et al.

(10) Patent No.: US 12,375,697 B2
(45) Date of Patent: Jul. 29, 2025

(54) COMPUTER-IMPLEMENTED METHOD AND APPARATUS FOR VIDEO CODING USING SUPER-RESOLUTION RESTORATION WITH RESIDUAL FRAME CODING

(71) Applicant: Amazon Technologies, Inc., Seattle, WA (US)

(72) Inventors: Byeongdoo Choi, Irvine, CA (US); Christopher Andrew Segall, Camas, WA (US); Kiran Mukesh Misra, Camas, WA (US)

(73) Assignee: Amazon Technologies, Inc., Seattle, WA (US)

( * ) Notice: Subject to any disclaimer, the term of this patent is extended or adjusted under 35 U.S.C. 154(b) by 7 days.

(21) Appl. No.: 18/186,006

(22) Filed: Mar. 17, 2023

(65) Prior Publication Data
US 2024/0236366 A1    Jul. 11, 2024

Related U.S. Application Data

(60) Provisional application No. 63/437,957, filed on Jan. 9, 2023.

(51) Int. Cl.
*H04N 19/42*       (2014.01)
*G06T 3/4053*    (2024.01)
(Continued)

(52) U.S. Cl.
CPC ........... *H04N 19/42* (2014.11); *G06T 3/4053* (2013.01); *H04N 19/117* (2014.11); *H04N 19/12* (2014.11);
(Continued)

(58) Field of Classification Search
CPC ..... G06T 3/4053; G06T 9/002; H04N 19/117; H04N 19/12; H04N 19/136; H04N 19/139;
(Continued)

(56) References Cited

U.S. PATENT DOCUMENTS 8,989,508 B2    3/2015  Deshpande
9,049,427 B2    6/2015  Hattori
(Continued)

OTHER PUBLICATIONS

Ding, Dandan et al., "Advances In Video Compression System Using Deep Neural Network: A Review And Case Studies", arXiv:2101.06341v1, Jan. 16, 2021, 27 pages.
(Continued)

*Primary Examiner* — Shahan Ur Rahaman
*Assistant Examiner* — Mohammed S Rahaman
(74) *Attorney, Agent, or Firm* — NICHOLSON DE VOS WEBSTER & ELLIOTT LLP

(57) ABSTRACT

The present disclosure relates to methods, apparatus, systems, and non-transitory computer-readable storage media for video coding using super-resolution restoration with residual frame coding. According to some examples, a computer-implemented method includes receiving a coded frame of a video; performing a video coding on the coded frame of the video to generate a resultant for the coded frame at a second lower resolution than a first resolution; upsampling the resultant in at least a vertical direction to a higher resolution than the second lower resolution to generate an upsampled resultant; generating a decoded frame based on at least the upsampled resultant; and transmitting the decoded frame to a frame buffer or to a display device.

20 Claims, 32 Drawing Sheets

(51) Int. Cl.
| | |
|---|---|
| *H04N 19/117* | (2014.01) |
| *H04N 19/12* | (2014.01) |
| *H04N 19/136* | (2014.01) |
| *H04N 19/139* | (2014.01) |
| *H04N 19/172* | (2014.01) |
| *H04N 19/176* | (2014.01) |
| *H04N 19/59* | (2014.01) |
| *H04N 19/60* | (2014.01) |
| *H04N 19/82* | (2014.01) |
| *H04N 19/91* | (2014.01) |

(52) U.S. Cl.
CPC ......... *H04N 19/136* (2014.11); *H04N 19/139* (2014.11); *H04N 19/172* (2014.11); *H04N 19/176* (2014.11); *H04N 19/59* (2014.11); *H04N 19/60* (2014.11); *H04N 19/82* (2014.11); *H04N 19/91* (2014.11)

(58) Field of Classification Search
CPC .... H04N 19/172; H04N 19/176; H04N 19/42; H04N 19/59; H04N 19/60; H04N 19/82; H04N 19/91
See application file for complete search history.

(56) References Cited

U.S. PATENT DOCUMENTS

| | | | |
|---|---|---|---|
| 9,319,703 B2 | 4/2016 | Wang | |
| 9,969,299 B2 | 5/2018 | Murase et al. | |
| 10,313,698 B2 | 6/2019 | Sullivan et al. | |
| 10,623,753 B2 | 4/2020 | Skupin et al. | |
| 11,700,390 B2 | 7/2023 | Wang | |
| 11,743,505 B2 | 8/2023 | Wang | |
| 11,765,394 B2 | 9/2023 | Wang et al. | |
| 11,812,062 B2 | 11/2023 | Wang | |
| 12,022,122 B2 | 6/2024 | Deshpande | |
| 12,034,927 B2 | 7/2024 | Okawa et al. | |
| 2006/0126952 A1* | 6/2006 | Suzuki | H04N 19/192 375/E7.199 |
| 2010/0220939 A1* | 9/2010 | Tourapis | H04N 19/577 382/261 |
| 2014/0086336 A1 | 3/2014 | Wang | |
| 2019/0068969 A1 | 2/2019 | Rusanovskyy et al. | |
| 2020/0374524 A1* | 11/2020 | Gao | H04N 19/105 |
| 2022/0321919 A1* | 10/2022 | Deshpande | H04N 19/117 |
| 2024/0137577 A1* | 4/2024 | Lin | G06T 3/4053 |
| 2024/0205439 A1 | 6/2024 | Sjberg et al. | |
| 2024/0214558 A1 | 6/2024 | Dumas et al. | |
| 2024/0236366 A1 | 7/2024 | Choi et al. | |
| 2024/0267548 A1 | 8/2024 | Du et al. | |
| 2024/0292003 A1 | 8/2024 | Damghanian et al. | |
| 2024/0422360 A1 | 12/2024 | Kang et al. | |

OTHER PUBLICATIONS

International Search Report and Written Opinion, PCT App. No. PCT/US2024/010748, May 3, 2024, 09 pages.
Kang, Jihong et al., "Multi-modal/multi-scale Convolutional Neural Network Based In-loop Filter Design for Next Generation Video Codec", IEEE International Conference on Image Processing (ICIP), Sep. 2017, pp. 26-30.
Wang, Zhao et al., "AHG11: Separate Density Attention Network for Loop Filtering", Joint Video Experts Team (JVET) of ITU-T SG 16 WP 3 and ISO/IEC JTC 1/SC 29, 22nd Meeting, Apr. 2021, 3 pages.
Zhao, Yanchen et al., "Joint Luma and Chroma Multi-Scale CNN In-loop Filter for Versatile Video Coding", IEEE International Symposium on Circuits and Systems (ISCAS), May 2022, pp. 3205-3209.
De Rivaz, P., et al., "AV1 Bitstream & Decoding Process Specification", Version 1.0.0 with Errata 1, Jan. 8, 2019, available online at https://aomediacodec.github.io/av1-spec/av1-spec.pdf, 681 pages.
The Linux Foundation, "CONV2D", PyTorch open source code, Dec. 2022, retrieved from https://pytorch.org/docs/stable/generated/torch.nn.Conv2d.html, 2 pages.
Non-Final Office Action, U.S. Appl. No. 18/342,406, Dec. 4, 2024, 14 pages.
Non-Final Office Action, U.S. Appl. No. 18/186,084, Aug. 14, 2024, 20 pages.
Final Office Action, U.S. Appl. No. 18/186,084, Mar. 7, 2025, 25 pages.
Notice of Allowance, U.S. Appl. No. 18/342,406, Mar. 19, 2025, 5 pages.
Kang, Jihong et al., "Multi-modal/Multi-scale Convolutional Neural Network Based In-loop Filter Design for Next Generation Video Codec", IEEE International Conference on Image Processing, Sep. 2017, 5 pages.
Wang, Zhao et al., "AHG11: Separate Density Attention Network for Loop Filtering", 22nd Meeting of the Joint Video Experts Team (JVET), Document No. JVET-V0074-v3, Apr. 2021, 3 pages.
Wang, Zhao et al., "Multi-Density Attention Network for Loop Filtering in Video Compression", arXiv:2104.12865v1, Apr. 8, 2021, 9 pages.
Notice of Allowance, U.S. Appl. No. 18/186,084, Jun. 24, 2025, 10 pages.

\* cited by examiner

1700

| obu_type | Name of obu_type |
|---|---|
| 0 | Reserved |
| 1 | OBU_SEQUENCE_HEADER |
| 2 | OBU_TEMPORAL_DELIMITER |
| 3 | OBU_FRAME_HEADER |
| 4 | OBU_TILE_GROUP |
| 5 | OBU_METADATA |
| 6 | OBU_FRAME |
| 7 | OBU_REDUNDANT_FRAME_HEADER |
| 8 | OBU_TILE_LIST |
| 9 | OBU_RESIDUAL_FRAME_HEADER |
| 10 | OBU_RESIDUAL_FRAME |
| 10-14 | Reserved |
| 15 | OBU_PADDING |

*FIG. 17*

| | Type |
|---|---|
| open_bitstream_unit( sz ) { | |
|   obu_header() | |
|   ... | |
|   if ( obu_has_size_field ) { | |
|   if ( obu_type == OBU_SEQUENCE_HEADER ) | |
|     sequence_header_obu( ) | |
|   else if ( obu_type == OBU_TEMPORAL_DELIMITER ) | |
|     temporal_delimiter_obu( ) | |
|   else if ( obu_type == OBU_FRAME_HEADER ) | |
|     frame_header_obu( ) | |
|   else if ( obu_type == OBU_RESIDUAL_FRAME_HEADER ) | |
|     frame_header_obu( ) | |
|   else if ( obu_type == OBU_RESIDUAL_FRAME ) | |
|     frame_obu( obu_size ) | |
|   ... | |
| } | |

| | Type |
|---|---|
| uncompressed_header( ) { | |
| ... | |
| if ( reduced_still_picture_header ) { | |
|   show_existing_frame = 0 | |
|   frame_type = KEY_FRAME | |
|   FrameIsIntra = 1 | |
|   show_frame = 1 | |
|   showable_frame = 0 | |
| } else { | |
|   show_existing_frame | f(1) |
|   frame_type = INTER_FRAME | |
|   FrameIsIntra = 0 | |
|   show_frame = 1 | |
|   showable_frame = 0 | |
|   frame_size() | |
|   render_size() | |
| } | |
| ... | |
| } | |

| | Type |
|---|---|
| frame_size( ) { | |
|   if ( frame_size_override_flag ) { | |
|     n = frame_width_bits_minus_1 + 1 | |
|     frame_width_minus_1 | f(n) |
|     n = frame_height_bits_minus_1 + 1 | |
|     frame_height_minus_1 | f(n) |
|     FrameWidth = frame_width_minus_1 + 1 | |
|     FrameHeight = frame_height_minus_1 + 1 | |
|   } else { | |
|     FrameWidth = max_frame_width_minus_1 + 1 | |
|     FrameHeight = max_frame_height_minus_1 + 1 | |
|   } | |
|   superres_params( ) | |
|   compute_image_size( ) | |
| } | |

| | Type |
|---|---|
| render_size( ) { | |
|   render_and_frame_size_different | f(1) |
|   if ( render_and_frame_size_different == 1 ) { | |
|     render_width_minus_1 | f(16) |
|     render_height_minus_1 | f(16) |
|     RenderWidth = render_width_minus_1 + 1 | |
|     RenderHeight = render_height_minus_1 + 1 | |
|   } else { | |
|     RenderWidth = UpscaledWidth | |
|     RenderHeight = UpscaledHeight | |
|   } | |
| } | |

| | Type |
|---|---|
| superres_params() { | |
|   if ( enable_superres ) | |
|     use_superres | f(1) |
|   else | |
|     use_superres = 0 | |
|   if ( use_superres ) { | |
|     coded_denom_x | f(SUPERRES_DENOM_BITS) |
|     coded_denom_y | f(SUPERRES_DENOM_BITS) |
|     SuperresDenomX = coded_denom_x + SUPERRES_DENOM_MIN | |
|     SuperresDenomY = coded_denom_y + SUPERRES_DENOM_MIN | |
|   } else { | |
|     SuperresDenomX = SUPERRES_NUM | |
|     SuperresDenomY = SUPERRES_NUM | |
|   } | |
|   UpscaledWidth = FrameWidth | |
|   UpscaledHeight = FrameHeight | |
|   FrameWidth = (UpscaledWidth * SUPERRES_NUM + | |
|               (SuperresDenomX / 2)) / SuperresDenomX | |
|   FrameHeight = (UpscaledHeight * SUPERRES_NUM + | |
|               (SuperresDenomY / 2)) / SuperresDenomY | |
| } | |

*FIG. 22*

```
compute_image_size( ) {
    MiCols = 2 == ( ( FrameWidth + 7 ) >> 3 )
    MiRows = 2 == ( ( FrameHeight + 7 ) >> 3 )
}
```

Type

$$\begin{bmatrix} h11 & h12 \\ h21 & h22 \end{bmatrix} = \begin{bmatrix} 1 & 0 \\ a & 1+b \end{bmatrix} \begin{bmatrix} 1+c & d \\ 0 & 1 \end{bmatrix}$$

$$\begin{bmatrix} h11 & h12 \\ h21 & h22 \end{bmatrix} = \begin{bmatrix} 1 & 0 \\ a & 1+b \end{bmatrix} \begin{bmatrix} 1+c & d \\ 0 & 1 \end{bmatrix} \begin{bmatrix} s1 & 0 \\ 0 & s2 \end{bmatrix}$$

*FIG. 25*

COMPUTER-IMPLEMENTED METHOD AND APPARATUS FOR VIDEO CODING USING SUPER-RESOLUTION RESTORATION WITH RESIDUAL FRAME CODING

CROSS-REFERENCE TO RELATED APPLICATIONS

This application claims the benefit of U.S. Provisional Application Ser. No. 63/437,957, filed Jan. 9, 2023, which is incorporated herein by reference in its entirety.

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit of, the general public. Service providers or content creators (such as businesses, artists, media distribution services, etc.) can employ one or more data centers to deliver content (such as web sites, web content, or other digital data) to users or clients.

BRIEF DESCRIPTION OF DRAWINGS

Various examples in accordance with the present disclosure will be described with reference to the following drawings.

FIG. 17 is a diagram illustrating open bitstream unit (OBU) data structure types with a residual frame header type and a residual frame type according to some examples.

FIG. 18 is a diagram illustrating an OBU syntax with a residual frame header type and a residual frame type according to some examples.

FIG. 19 is a diagram illustrating an OBU uncompressed header syntax according to some examples.

FIG. 20 is a diagram illustrating an OBU frame size syntax according to some examples.

FIG. 21 is a diagram illustrating an OBU render size syntax according to some examples.

FIG. 22 is a diagram illustrating an OBU super-resolution parameters syntax according to some examples.

FIG. 23 is a diagram illustrating an OBU compute image size syntax according to some examples.

FIG. 24 is a diagram illustrating a calculation of affine parameters without a super-resolution scaling factor according to some examples.

FIG. 25 is a diagram illustrating a calculation of affine parameters with a super-resolution scaling factor according to some examples.

DETAILED DESCRIPTION

The present disclosure relates to methods, apparatus, systems, and non-transitory computer-readable storage media for video coding using super-resolution restoration with residual frame coding. Certain examples herein are directed to a video coding technology (e.g., method) for coding video that incorporates an upsampling and super-resolution approach into the coding loop. Certain examples herein have the benefit of both improving coding efficiency and reducing the computational complexity of a video compression system, e.g., by allowing some coding operations to be performed at different spatial resolutions. In some examples, these different spatial resolutions may change for different frames or pictures. Examples herein provide the benefits of: (i) methods for reducing the memory consumption of the decoded picture buffer, (ii) methods to perform motion vector coding and motion compensation between pictures with different spatial resolutions, and/or (iii) methods for coding residual information at a different spatial resolution than other coding processes. Certain examples herein incorporate a neural network approach to increase the resolution.

In certain examples, an encoding mode (e.g., with different encoding modes selectable for each macroblock of a frame) is selected for a video encoder, e.g., an encoding mode according to a video coding standard. In one example, the video coding standard is an Advanced Video Coding (AVC) standard, for example, a H.264 standard. In one example, the video coding standard is an Alliance for Open Media (AOM) standard, for example, an AV1, AV2, etc. standard.

Figure 1:
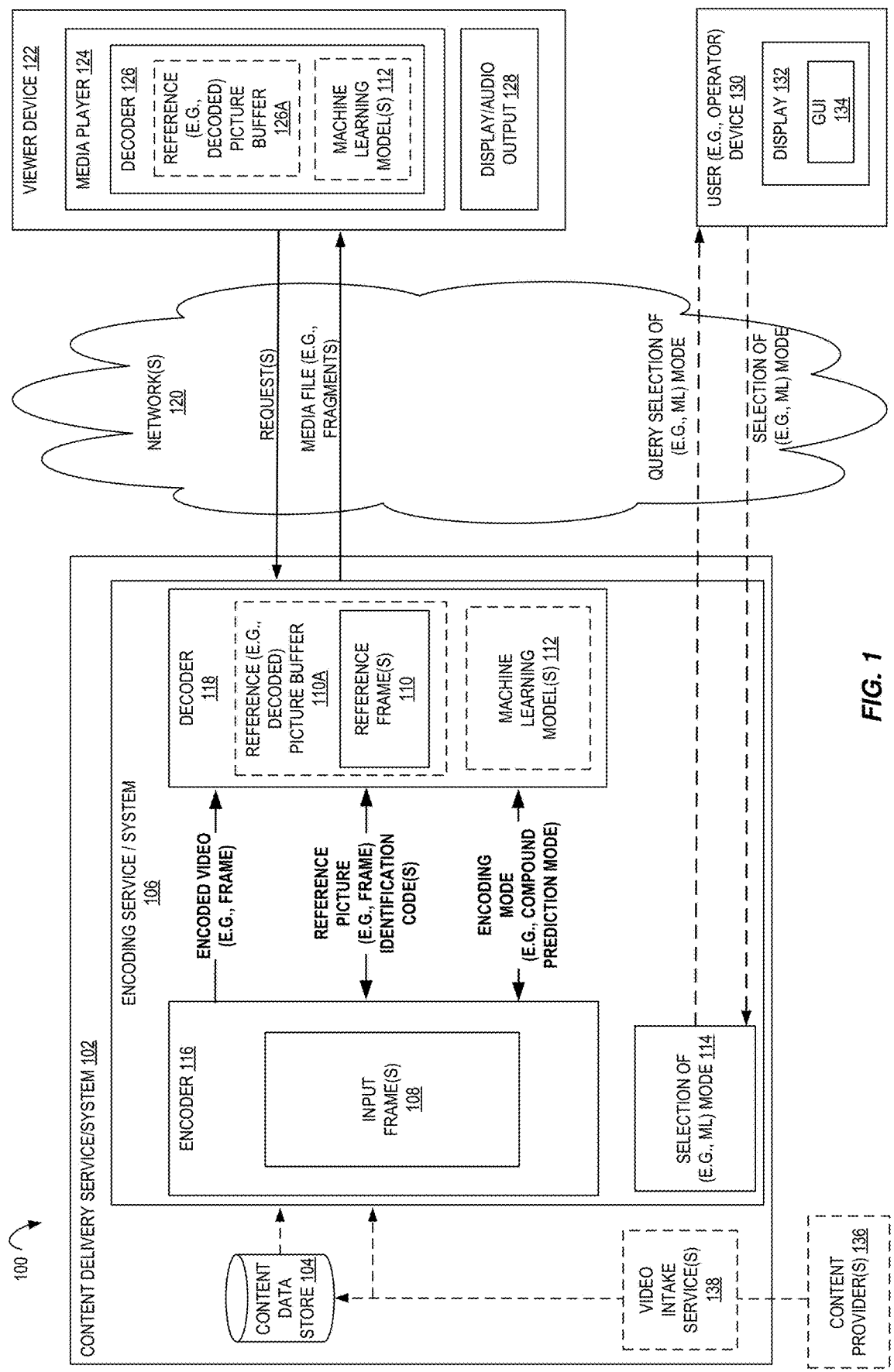
FIG. 1 is a diagram illustrating an environment including a content delivery service/system, having an encoding service/system to encode a media file using a (e.g., multi-scale) machine learning model and send the encoded media file to a viewer device according to some examples.

FIG. 1 is a diagram illustrating an environment including a content delivery service/system 100, having an encoding service/system 106 to encode a media file (e.g., input frame(s) 108) according to a reference picture identification code format (e.g., of the one or more (e.g., compound) encoding modes), to send the encoded media file to a viewer device 122 according to some examples. In certain examples, video compression (e.g., of a content delivery service/system/service) includes an encoding mode for certain proper subset(s) of the input video. An encoding mode may be in accordance with a video coding (e.g., encoding) standard. A decoding mode may be in accordance with a video coding (e.g., decoding) standard.

Encoding (e.g., by encoder 116) may compress a video file (e.g., input frame(s) 108) into a plurality of compressed frames, for example, one or more an intra-coded picture frames (I-frames) (e.g., with each I-frame as a complete image), one or more predicted picture frames (P-frames or delta-frames) (e.g., with each P-frame having only the changes in the image from the previous frame), and/or one or more bidirectional predicted picture frames (B-frames) (e.g., that further saves space (e.g., bits) by using differences between the current frame and the preceding and/or following frames to specify its content). For example, with P-frames and B-frames being inter-coded pictures. In one example, each single I-frame corresponds to (e.g., is associated with) a plurality of inter-coded frames (e.g., P-frames and/or B-frames), e.g., as a group of pictures (GOP). In certain examples, an encoder selects one or more prediction styles for a slice (e.g., a sequence of macroblocks), for example, switching I (SI) frame (e.g., slice) that facilitates switching between coded streams (e.g., containing SI-macroblocks as a special type of intra coded macroblock and/or switching P (SP) frame (e.g., slice) that facilitates switching between coded streams (e.g., containing contains P and/or I-macroblocks). In certain examples, a slice can be a whole frame, e.g., but it is not required that a whole frame is a slice.

An encoding and/or decoding algorithm (e.g., specified by a video coding standard) may select between inter and intra coding for (e.g., block-shaped) regions of each picture (e.g., frame 108). In certain examples, inter coding (e.g., as indicated by an "inter" mode) uses motion vectors for (e.g., block-based) inter prediction from other pictures (e.g., frames), e.g., to exploit temporal statistical dependencies between different pictures. The reference pictures (e.g., reference frames) 110 may be stored in a reference picture buffer 110A. In certain examples, intra coding (e.g., as indicated by an "intra" mode) uses various spatial predictions to exploit spatial statistical dependencies in the source signal for a single picture (e.g., frame). In certain examples, motion vectors and intra prediction modes are specified for a variety of block sizes in the picture. In certain examples, the prediction residual is then further compressed using a transform to remove spatial correlation inside the transform block before it is quantized, producing an irreversible process that typically discards less important visual information while forming a close approximation to the source samples. In certain examples, the motion vectors or intra prediction modes are combined with the quantized transform coefficient information and encoded, e.g., using either variable length coding or arithmetic coding.

An encoding and/or decoding mode (e.g., to be used to encode and/or decode a particular macroblock of a frame, respectively) may include one, all, or any combination of the following: direct mode, inter mode, or intra mode. A direct mode may cause encoding with an inter prediction for a block for which no motion vector is decoded. Examples of two direct prediction modes are spatial direct prediction mode and temporal prediction mode.

In certain examples, a mode has one or more sub-modes that are to be specified. In same examples, the same (e.g., prediction) mode is used for corresponding chroma (component) and luminance (component) blocks.

For example, a direct mode may include a skip mode (e.g., sub-mode) and/or a B-frame (e.g., B-slice) direct mode (e.g., sub-mode). In one example, skip mode is for P-frames (e.g., P-slices), for example, where the (e.g., spatial direct prediction) motion is derived directly from previously encoded information (e.g., thus not having to encode any additional motion data for a macroblock). In one example, direct mode is for B-frames (e.g., B-slices), for example, where the (e.g., temporal prediction) motion is derived directly from previously encoded information (e.g., thus not having to encode any additional motion data for a macroblock). Previously encoded information may be stored in a reference picture buffer 110A, for example, list 0 (L0) references being a reference picture list used for inter prediction of a P, B, or SP slice (e.g., block). In certain examples, inter prediction used for P and SP slices uses (reference picture) list 0 (L0). Owing to the bi-predictive (e.g., before or after the current frame in video order), a certain (e.g., DIRECT) mode may utilize two motion vectors pointing to different references. In certain examples, inter prediction used for B slices uses (reference picture) list 0 and (reference picture) list 1 (L1).

For example, an inter mode (e.g., sub-mode) may include a (e.g., luminance) block partition size, e.g., 16×16, 16×8, 8×16, or 8×8 (pixels×pixels). An inter mode may use a transform, e.g., a 4×4 transform or 8×8 transform.

For example, an intra mode (e.g., sub-mode) may include a (e.g., luminance) block partition size, e.g., intra4×4, intra8×8 and intra16×16. For example, intra4×4 may include further prediction sub-modes of vertical, horizontal, DC, diagonal-down-left, diagonal-down-right, vertical-right, horizontal-down, vertical-left, and/or horizontal-up.

An encoding mode may be used to encode a particular slice of a frame, e.g., where a slice is a spatially distinct region of a frame that is encoded separately from any other region in the same frame and/or where a slice is a plurality of macroblocks (e.g., a sequence of macroblock pairs).

An encoding mode (e.g., of encoder 116) may be separate from encoder settings, e.g., separate from values setting one, all, or any combination of the following in an encoder: spatial adaptive quantization strength, temporal adaptive quantization strength, flicker reduction, dynamic group-of-pictures (GOP) on/off, number of B-frames (e.g., per GOP), direct mode (e.g., allowing B-frames to use predicted motion vectors instead of actual coding of each frame's motion) (e.g., for a scene), prefilter on/off, delta quantization parameter (QP) offsets (e.g., between I-frame and P-frames/B-frames), rate distortion optimization quantization (RDOQ), speed settings, or additional configuration (e.g., encoder) settings.

In certain examples (e.g., at the start of the video encoding process) a content delivery service/system/service is to select the encoding modes, e.g., for each macroblock (or slice) of a frame. This may include a mode selection that is to select a (e.g., optimal from a visual quality perspective) single mode by looping through all the available modes by encoding (e.g., by encoder 116) according to a mode then decoding (e.g., by decoder 118) and measuring the quality between the media (e.g., macroblock) that was encoded versus the decoded version.

In certain examples (e.g., for a compound mode), encoder 116 is to encode a frame 108 and send it to decoder 118 to decode the encoded frame. In certain examples, a version of the frame 108 is reconstructed out of the bitstream by the decoder 118. In certain examples, one or more of the decoded frames, from the encoder 116, generated by the decoder 118 is input into reference (e.g., decoded) picture buffer 110A (e.g., decoded frame buffer/list or reference frame buffer/list). In certain examples, the reference frame(s) 110 in the picture buffer 110A (e.g., which is less than all of the frames in a video) are used to encode an input frame 108, for example, via an inter prediction (e.g., prediction value) for the current frame using previously decoded reference frames 110.

Certain (e.g., AOM) coding standards (e.g., codecs) allow a maximum number of (e.g., eight frames) in its reference picture buffer 110A. In certain examples, for encoding a frame 108, encoder 116 can choose a proper subset of (e.g., seven) frames from the reference picture buffer 110A as its reference frames. In certain examples, the bitstream allows the encoding service/system 106 to explicitly assign each reference a unique reference frame index (e.g., ranging from 1 to 7). In some examples, the reference frames indices 1-4 are designated for the frames that precede the current frame in display (e.g., picture or video) order, while indices 5-7 are for reference frames coming after the current one. In certain examples of compound inter prediction, two references can be combined to form the prediction. In certain examples, if both reference frames either precede or follow the current frame, this is a unidirectional compound prediction, e.g., in contrast with a bidirectional compound prediction where there is one previous and one future reference frame in display (e.g., picture or video) order. In certain examples, the encoding service/system 106 (e.g., coding standard thereof) links a reference frame index to any frame in the decoded frame buffer, e.g., which allows it to fill all the reference frame indices when there are not enough reference frames on either side. In certain examples, when a frame coding is complete, the encoding service/system 106 decides which (if any) reference frame in the reference picture buffer 110A to replace, e.g., and explicitly signals this in the bitstream. In certain examples, encoding service/system 106 allows for bypassing of updating the reference picture buffer 110A, e.g., for high motion videos where certain frames are less relevant to neighboring frames.

In certain examples, the reference picture buffer 110A update is implemented through two syntaxes in the frame level: (1) a multiple bit (e.g., eight-bit) reference Refresh Flag, e.g., with each bit signaling whether the corresponding frame in the reference picture buffer 110A is to be refreshed or not by the newly coded frame, and/or (2) virtual index mapping where each of the reference frames is labeled by a unique virtual index, and both the encoder 116 and the decoder 118 maintain a reference frame map to associate a virtual index with the corresponding physical index that points to its location within the reference picture buffer 110A. In certain examples, both the refresh flag and the virtual indices are written into the bitstream, e.g., using such mapping mechanism is to avoid memory copying whenever reference frames are being updated.

In certain examples, encoding service/system 106 includes a field 114, that when set, causes the encoding service/system 106 (e.g., encoder 116 and/or decoder 118) to utilize the functionality discussed herein, for example, to enter a particular (e.g., multi-scale) machine learning mode. In certain example, the decoder 118 includes one or more machine learning (e.g., prediction) models 112 (e.g., convolutional neural network (CNN)), e.g., used to generate a prediction according to this disclosure.

The depicted content delivery service/system 102 includes a content data store 104, which may be implemented in one or more data centers. In one example, the media file (e.g., video file that is to be viewed by the viewer device 122) is accessed (for example, from the content data store 104 or directly from a content provider 136, e.g., as a live stream) by encoder 116 (e.g., by media file (e.g., fragment) generator thereof). In certain examples, the content delivery service/system 102 includes a video intake service(s) 138 to intake a video, e.g., from content provider(s) 136.

In certain examples, the (e.g., client) viewer device 122 requesting the media file (e.g., fragment(s) of media) from content delivery service/system 102 causes the encoder 116 to encode the video file, e.g., into a compressed format for transmittal on network(s) 120 to viewer device 122. In one example, a media file generator of encoder 116 generates one or more subsets (e.g., frames, fragments, segments, scenes, etc.) of the media file (e.g., video), e.g., beginning with accessing the media file and generating the requested media (e.g., fragment(s)). In one example, each fragment includes a plurality of video frames.

In FIG. 1, content delivery service/system 102 is coupled to viewer device 122 and user device 130 via one or more networks 120, e.g., a cellular data network or a wired or wireless local area network (WLAN).

In certain examples, content delivery service/system 102 (e.g., encoding service/system 106 thereof) is to send a query asking for the selection of a mode (e.g., one or more of a plurality of (e.g., ML) modes) (e.g., as in FIGS. 3-27)) is desired) to user (e.g., operator) device 130, for example, and the user device 130 (e.g., in response to a command from a user of the device 130) is to send a response (e.g., an indication of that mode 114). Depicted user device 130 includes a display 132 having a graphical user interface (GUI) 134, e.g., to display a query for encoding service/system 106 to enter (or not) a particular mode 114, e.g., one or more of a plurality of different respective modes (e.g., as in FIGS. 3-27). In certain examples, the mode is a super-resolution mode that includes vertical upscaling and/or vertical downscaling.

Depicted viewer device 122 (e.g., where the viewer is a customer of user (e.g., operator) of device 130) includes a media player 124 having a decoder 126 (e.g., separate from decoder 118 of encoding service/system 106) to decode the media file (e.g., fragment) from the content delivery service/system 102, e.g., to display video and/or audio of the media file on display and/or audio output 128, respectively. In certain example, the decoder 126 includes one or more machine learning (e.g., prediction) models 112 (e.g., convolutional neural network (CNN)), e.g., used to generate a prediction according to this disclosure. In certain examples, the ML model 112 is a restoration ML model, e.g., to output an improved version of an input image. For example, ML model 112 as an instance of the restoration ML model 706 in FIG. 7 and/or the restoration ML model 1006 in FIG. 10. In certain examples, the decoder 126 (e.g., as code and/or hardware) includes a reference (e.g., decoded) picture buffer 126A. In certain examples, the decoder 126 receives an indication (e.g., a syntax element in a bitstream) of the media file (for example, within a header thereof the media file, e.g., a sequence and/or picture header for that encoded media) of the type of identification code and/or the number of the reference slots (e.g., reference frames in the reference picture list) which may be used for compound mode. In certain examples, any encoder and/or decoder (e.g., the decoder 126) is to have knowledge of the format of the "reference picture identification code" used. In certain examples, the decoder 126 is to decode the encoded frame (e.g., picture) based on (i) the already decoded (e.g., reference) frames in its reference (e.g., decoded) picture buffer 126A and (ii) an identification code of the reference frames for use in the decoding of the current frame (e.g., and the format of the "reference picture identification code"). In certain examples, the decoded current frame is then played by the media player 124, e.g., displayed on the display 128.

Figure 2:
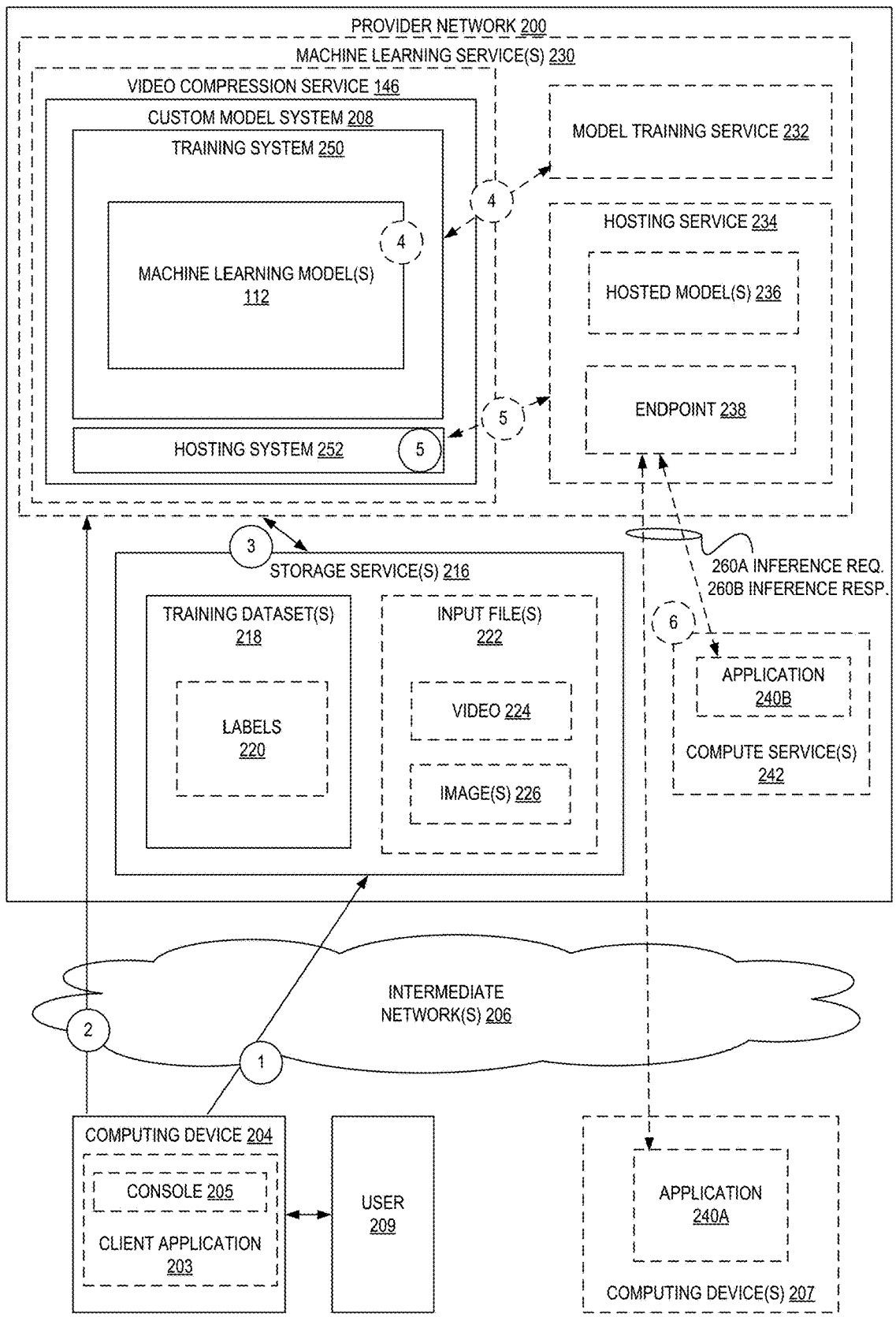
FIG. 2 is a diagram illustrating an environment for creating, training, and using a (e.g., multi-scale) machine learning model according to some examples.

FIG. 2 is a diagram illustrating an environment for creating, training, and using one or more machine learning models 112 according to some examples. FIG. 2 includes a video compression service 146, one or more storage services 216, one or more machine learning services 230, and one or more compute services 242 implemented within a multi-tenant provider network 200. Each of the video compression service 146, one or more storage services 216, one or more machine learning services 230, one or more model training services 232, one or more hosting services 234, and one or more compute services 242 may be implemented via software, hardware, or a combination of both, and may be implemented in a distributed manner using multiple different computing devices.

A provider network 200 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances or a serverless code execution service that executes code (either of which may be referred to herein as a compute service 242), a storage service 216 that can store data objects, etc. The users (or "customers") of provider networks 200 may utilize one or more user accounts that are associated with a customer account, though these terms may be used somewhat interchangeably depending upon the context of use. Users may interact with a provider network 200 across one or more intermediate networks 206 (e.g., the internet) via one or more interface(s), such as through use of application programming interface (API) calls, via a console 205 implemented as a website or application, etc. The interface(s) may be part of, or serve as a front-end to, a control plane of the provider network 200 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide these and other computing resource services, provider networks 200 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

For example, in various examples, a "serverless" function may include code provided by a user or other entity—such as the provider network itself—that can be executed on demand. Serverless functions may be maintained within provider network 200 by an on-demand code execution service (which may be one of compute service(s) 242) and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute instance, such as a virtual machine, container, etc., when triggered or invoked. In some examples, a serverless function can be invoked through an application programming interface (API) call or a specially formatted HyperText Transport Protocol (HTTP) request message. Accordingly, users can define serverless functions (e.g., as an application 240B) that can be executed on demand, without requiring the user to maintain dedicated infrastructure to execute the serverless function. Instead, the serverless functions can be executed on demand using resources maintained by the provider network 200. In some examples, these resources may be maintained in a "ready" state (e.g., having a pre-initialized runtime environment configured to execute the serverless functions), allowing the serverless functions to be executed in near real-time.

The video compression service 146, in some examples, is a machine learning powered service that generates one or more predictions for video compression, e.g., as discussed in reference to FIGS. 3-27.

The training system 250, for example, may enable users to generate one or more machine learning models (e.g., machine learning model(s) 112) (e.g., restoration machine learning model).

Examples herein allow the creation of one or more machine learning models 112 by supplying a training dataset 218 (for example, including labels 220).

In some examples, the video compression service 146—via use of a custom model system 208—allows users to build and use model(s) 112.

At a high level, machine learning may include two major components that are required to be put in place in order to expose advertised functionality to the customer: (i) training and (ii) inference. Training may include the following responsibilities: training data analysis; data split (training, evaluating (e.g., development or validation), and/or testing data); model selection; model training; model evaluation; and status reporting. Inference may include the following responsibilities: model loading and hosting; and inference (e.g., synchronous and batch).

Training may include training a candidate algorithm into model(s), e.g., into machine learning model 112, and respective configurations (e.g., coefficients and/or hyperparameters). Training may perform a grid search over the matrix of experiments (e.g., defined upfront) in search for the model and its parameters (e.g., hyperparameters) that performs best on the given dataset.

Thus, a user 209 may provide or otherwise identify data 218 (e.g., with labels 220) for use in creating a custom model. For example, as shown at circle (1), the user 209 may utilize a client application 203 executed by a computing device 204 (e.g., a web-application implementing a console 205 for the provider network 200, a standalone application, another web-application of another entity that utilizes the classification service 146 as a part of its backend, a database or mixed-SQL environment, etc.) to cause the computing device 204 to upload the data 218 to a storage location (e.g., provided by a storage service 216 such as an object storage service of a provider network 200).

The data 218 may be a columnar dataset that includes rows (or entries) of data values, where the data values may be arranged according to one or more columns (or attributes) and may be of a same datatype (e.g., one storing text). In some cases, the data 218 includes headings or other metadata describing names or datatypes of the columns, though in some cases this metadata may not exist. For example, some or all of the data 218 may have been provided by a user as a plaintext file (e.g., a comma-separated values (CSV) or tab-separated values (TSV) file), an exported database table or structure, an application-specific file such as a spreadsheet, etc.

For example, when a user 209 desires to train a model 112, this file (or files) may include labels corresponding to the file (e.g., video, audio, and/or text), e.g., with a label indicating category(ies) of content in the file.

Thereafter, at circle (2) the computing device 204 may issue one or more requests (e.g., API calls) to the machine learning service 230 that indicate the user's 209 desire to train one or more algorithms into model(s), e.g., into a machine learning model 112. The request may be of a type that identifies which type of model(s) are to be created or identifies that the machine learning service 230 itself is to identify the candidate model(s), e.g., candidate machine learning model 112. The request may also include one or more of an identifier of a storage location or locations storing the data 218 (e.g., an identifier of the labels 220), which may identify a storage location (e.g., via a Uniform Resource Locator (URL), a bucket/folder identifier, etc.) within the provider network 200 (e.g., as offered by a storage service 216) or external to the provider network 200, a format identifier of the data 218, a language identifier of the language of the labels 220, etc. In some examples, the request includes an identifier (e.g., from the user 209) of the candidate algorithm(s) themselves within the request. In certain examples, the storage service 216 stores input file(s) 222, for example, video 224 and/or image(s) 226.

Responsive to receipt of the request, the custom model system 208 of the machine learning service 230 is invoked and begins operations for training the corresponding type of model. For example, the custom model system 208 may identify what type of model is to be trained (e.g., via analyzing the method call associated with the request), the storage location(s) associated with the data 218 (e.g., labels 220), etc. Thus, the custom model system 208 may retrieve any stored data 218 elements as shown at circle (3), which may be from a storage location within the provider network 200 or external to the provider network 200.

In some examples, the training (at dotted circle (4) in model(s) 112) of model(s) 112 includes performing (at optional, dotted circles (4)) by training service 232 of machine learning service 230 a particular training job (e.g., hyperparameter optimization tuning job), or the like.

In some examples, the hosting system 252 (at circle (5)) of the custom model system 208 may make use (at optional, dotted circle (5)) of a hosting service 234 of a machine learning service 230 to deploy a model as a hosted model 236 in association with an endpoint 238 that can receive inference requests from client applications 240A and/or 240B at circle (8), provide the inference requests 260A to the associated hosted model(s) 236, and provide inference results 260B (e.g., a prediction) back to applications 240A and/or 240B, which may be executed by one or more computing devices 207 outside of the provider network 200 or by one or more computing devices of a compute service 242 (e.g., hardware virtualization service, serverless code execution service, etc.) within the provider network 200. Inference results 260B may be displayed to a user and/or viewer (e.g., in a graphical user interface of the application) and/or exported as a data structure (e.g., in a selected format). In certain examples, the inference results are utilized by encoding service/system 106.

Video Compression

In certain examples, video compression systems include video encoding, video decoding, and video postprocessing (e.g., via post-processor 312) operations. In certain examples, a video encoder receives one or more images (or equivalently frames or pictures) with one or more color channels as input and generates a bit-stream as output. In certain examples, the video decoder receives all or part of the bit-stream as input and generates one or more images as output. These output pictures are similar to the images received by the encoder but may not be identical. A video post-processor is optional but receives the pictures generated by the decoder as input and generates enhanced pictures as output. An example video compression system is shown in FIG. 3 (e.g., an overview of a video compression system 300).

Figure 3:
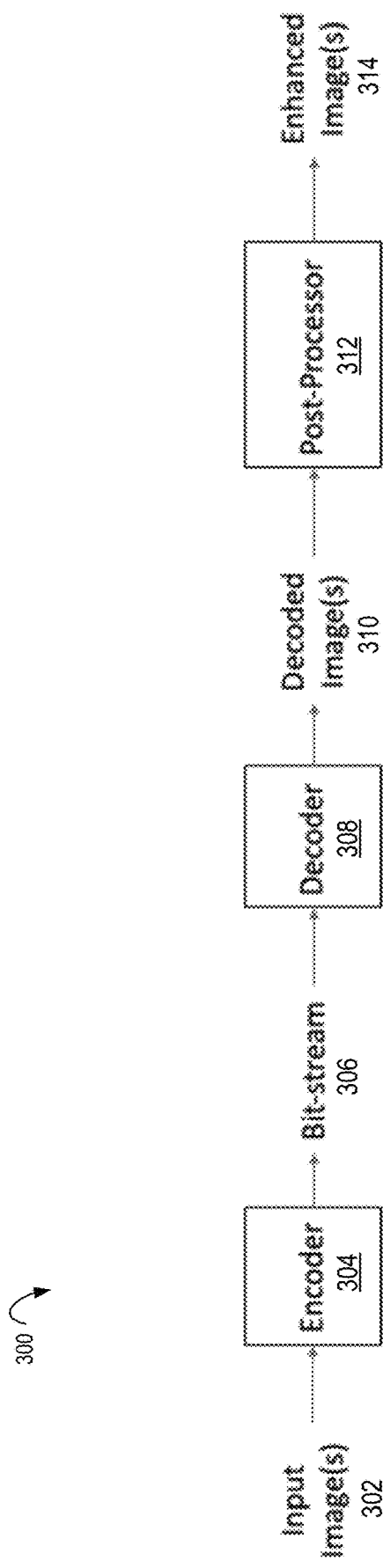
FIG. 3 is a diagram illustrating a video compression system including an encoder and a decoder according to some examples.

FIG. 3 is a diagram illustrating a video compression system 300 including an encoder 304 and a decoder 308 according to some examples. In certain examples, encoder 304 is an instance of encoder 116. In certain examples, decoder 308 is an instance of decoder 126. In certain examples, decoder 308 is an instance of decoder 118.

In certain examples, encoder 304 receives an input of image(s) (e.g., frame(s) of a video) and generates an output of a bit-stream 306 (e.g., coded bitstream of the video). In certain examples, decoder 308 receives an input of a bit-stream 306 (e.g., coded bitstream of the video) and generates an output of decoded image(s) 310 (e.g., decoded frame(s) of the video). In certain examples, video compression system 300 outputs enhanced image(s) 314. In certain examples, an (optional) post processor 312 receives an input of decoded image(s) 310 (e.g., decoded frame(s) of the video) and generates an output of enhanced image(s) 314 (e.g., enhanced decoded frame(s) of the video).

Video compression systems may use a video coding standard (e.g., the H.264, HEVC, VVC, VP9 or AV1 standards) to describe one or more of the bit-stream, decoder, encoder, or post-processor. In certain examples, the video coding standard defines the construction of the bit-stream and/or the decoding process. An example video encoder is shown in FIG. 4.

Figure 4:
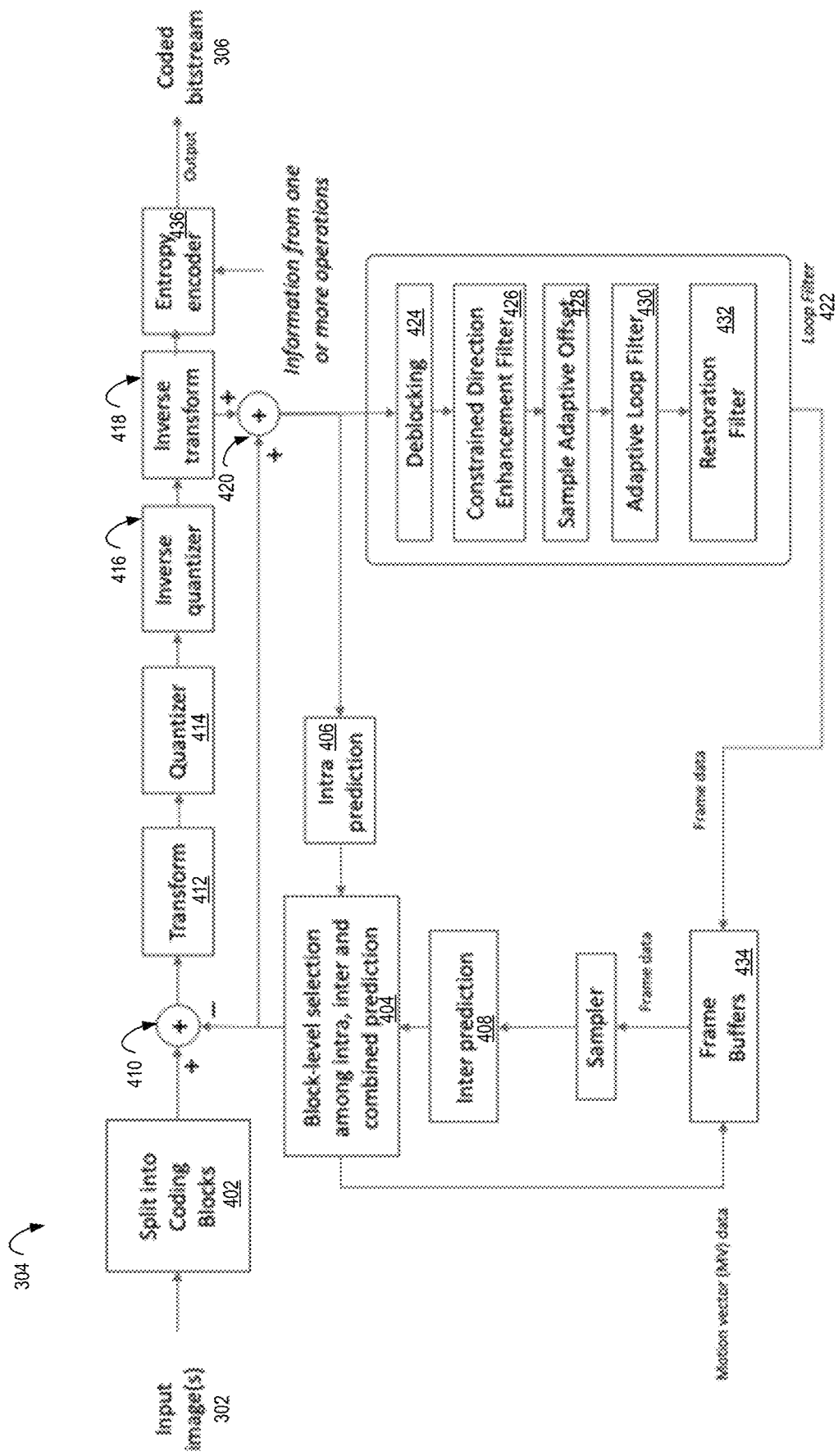
FIG. 4 is a diagram illustrating a video encoder according to some examples.

FIG. 4 is a diagram illustrating a video encoder 304 according to some examples. As can be seen in FIG. 4, the encoder 304 receives an image as input and split operation 402 divides the image into spatial regions for coding. These spatial regions may be referred to as macroblocks, super-blocks, coding tree units, or other terms known to those skilled in the art. In certain examples, the spatial regions are then further partitioned. For example, each super-block (e.g., in AV1) may be recursively split into coding blocks ranging in size (e.g., from 128×128 samples to 4×4 samples) and/or with square and/or rectangular shapes. Furthermore, the spatial regions may also be combined into larger spatial regions referred to as tiles, slices, or other terms known to those skilled in the art.

Figure 5:
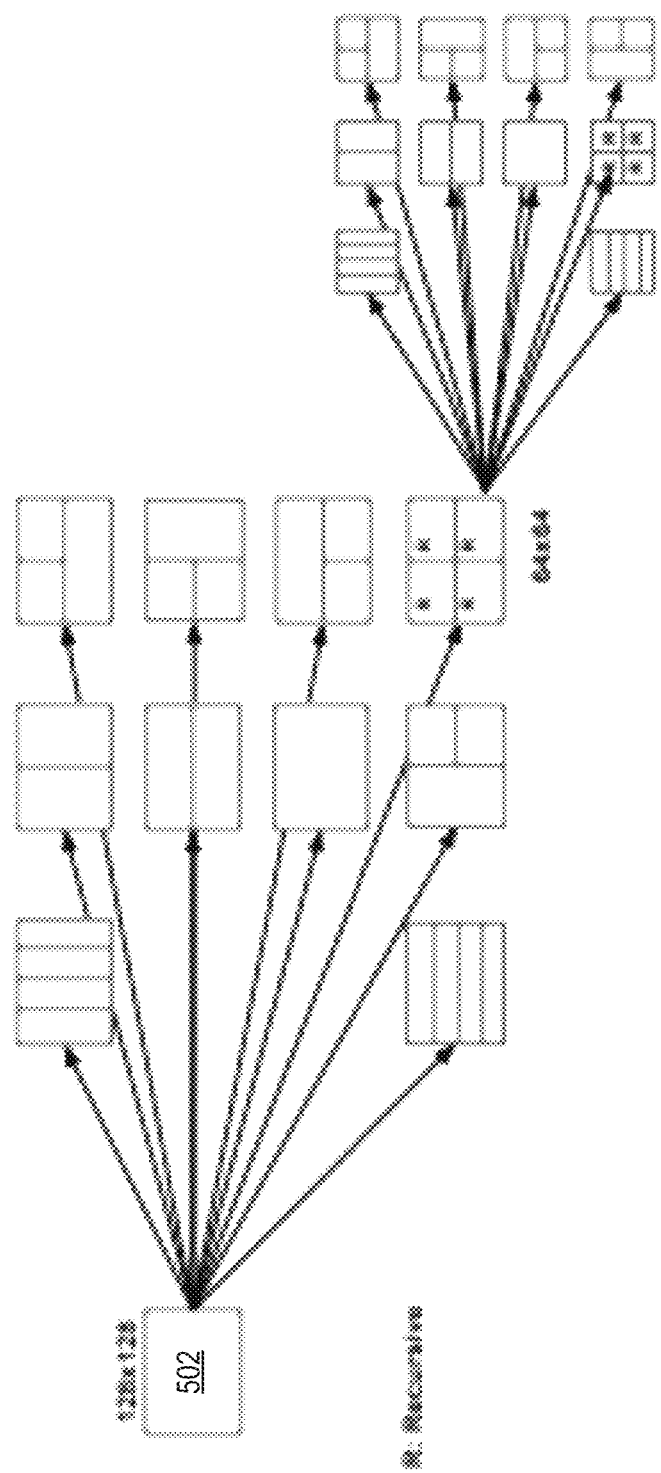
FIG. 5 is a diagram illustrating partitioning of a larger block (e.g., super-block) into smaller blocks (e.g., coding blocks) according to some examples.

Both may be done either jointly or independently for the color channels. An example of partitioning shapes (e.g., partitioning of a super-block into coding blocks) is shown in FIG. 5. FIG. 5 is a diagram illustrating partitioning of a larger block (e.g., super-block) 502 into smaller blocks (e.g., coding blocks) according to some examples. In certain examples, a sample (or pixel) corresponds to a specific location within a frame and color channel. For two-dimensional images, this specific location may be a horizontal and vertical index into the color channel of the frame, e.g., which stores the value for the image at that index.

Returning to FIG. 4, in certain examples, each coding block is first predicted using either intra frame prediction, inter frame prediction, or a combination of the predictions at 404. In certain examples, intra frame prediction 406 predicts a current coding block from previously coded and spatially neighboring blocks. This prediction may be done with directional intra prediction that predicts the sample values of the current coding block by extrapolating previously coded information along a prediction direction. The prediction may also be done with non-directional intra-prediction, such as non-directional smooth intra prediction, recursive intra-prediction, intra block copy and color palette techniques.

In certain examples, inter frame prediction 408 uses information from previously coded frames for prediction that are stored in one or more frame buffers. One method for performing this prediction uses a translational motion model. In this approach, the spatial offsets (or motion vectors) between the current coding block and a previously decoded frame are used to translate a region of the previously coded frame and use the translated version for prediction. Different precisions for the motion vectors are possible, such as ⅛ pixel motion vector accuracy. And different interpolation filters can also be selected. In addition to a translational motion approach, alternative methods (or prediction models) for performing inter frame prediction include affine motion compensation and overlapped block motion compensation. Moreover, one or more of these models may predict the current coding block from more than one previously coded locations in previously decoded frames. One example is the compound prediction mode in AV1. Strategies for combining the more than one prediction include computing a weighted average based on the temporal distance between each previously coded block and the current coded block. In the case that the previously coded frame is a different resolution than the input frame, a sampler may optionally convert the spatial resolution of a previously coded frame.

In some video coding systems, it is possible to use a combination of intra frame and inter-frame prediction for a current coded block. For example, a coding block may be divided into two regions. And the first region predicted using an intra frame prediction method and the second region using an inter frame prediction region. As a second example, an intra frame prediction and an inter frame prediction may be averaged to predict the current coding block.

Following the prediction of each block, residual information may be added at 410 to the prediction. An encoder 304 may first calculate a difference between the prediction and the original frame data 302, apply an optional transform 412 to the difference, and quantize 414 the coefficients that are output by the transform. In certain examples, at both an encoder and a decoder, the residual is computed by de-quantizing 416 (e.g., an inverse quantization) the quantized coefficients computed by an encoder, applying an optional inverse transform 418 to de-quantized coefficients, and adding at 420 the result of the inverse transform to the predicted block. Note that the sequential process of quantization and de-quantization may not result in the same output as the input that was provided to the quantization process. Similarly, the sequential process of a transform followed by an inverse transform may not result in the same output as the input that was provided to the transform.

The reconstructed block corresponding to the addition of the prediction and residual information may then be processed by one or more in-loop filters 422 (or operations). In certain examples, these filters improve the fidelity of reconstructed blocks and may include processes such as deblocking filters 424, constrained directional enhancement filter (CDEF) 426, sample adaptive offset filters 428, adaptive loop filters 430, and/or loop restoration filters 432. These operations may use different partitioning than the reconstructed blocks.

In certain examples, the output (e.g., improved image) of the one or more loop (e.g., in-loop) filters 422 is stored in a frame buffer 434 (or decoded picture buffer) for use in the inter prediction of coding blocks in different frames. In certain examples, frame buffer 434 is an instance of buffer 110A in FIG. 1. Additionally, the output may be processed by out-of-loop filters (or operations) to further modify the output. Examples of these filters (or postprocessing filters) include spatial resizing, color conversion, film grain synthesis, and debanding operations. In certain examples, that result is not stored in the decoded picture buffer.

Information computed during the encoding process may be signaled in a bit-stream 306. For example, the partitioning of regions for coding, intra prediction directions, motion vectors, quantized transform coefficients, and in-loop filter control information may be signaled. In certain examples, this information is sent (e.g., without loss) using an entropy coding system (e.g., entropy encoder 436). In certain examples, the encoder 436 takes as input information from one or more of the depicted operations, e.g., quantized values that are output from quantizer 414. In certain examples (e.g., AV1), the entropy coding system using a M-ary arithmetic coder. In certain examples (e.g., VVC), the entropy coding system uses a context-adaptive binary arithmetic coder. In certain examples, the information is then extracted from the bit-stream by the decoder.

Figure 6:
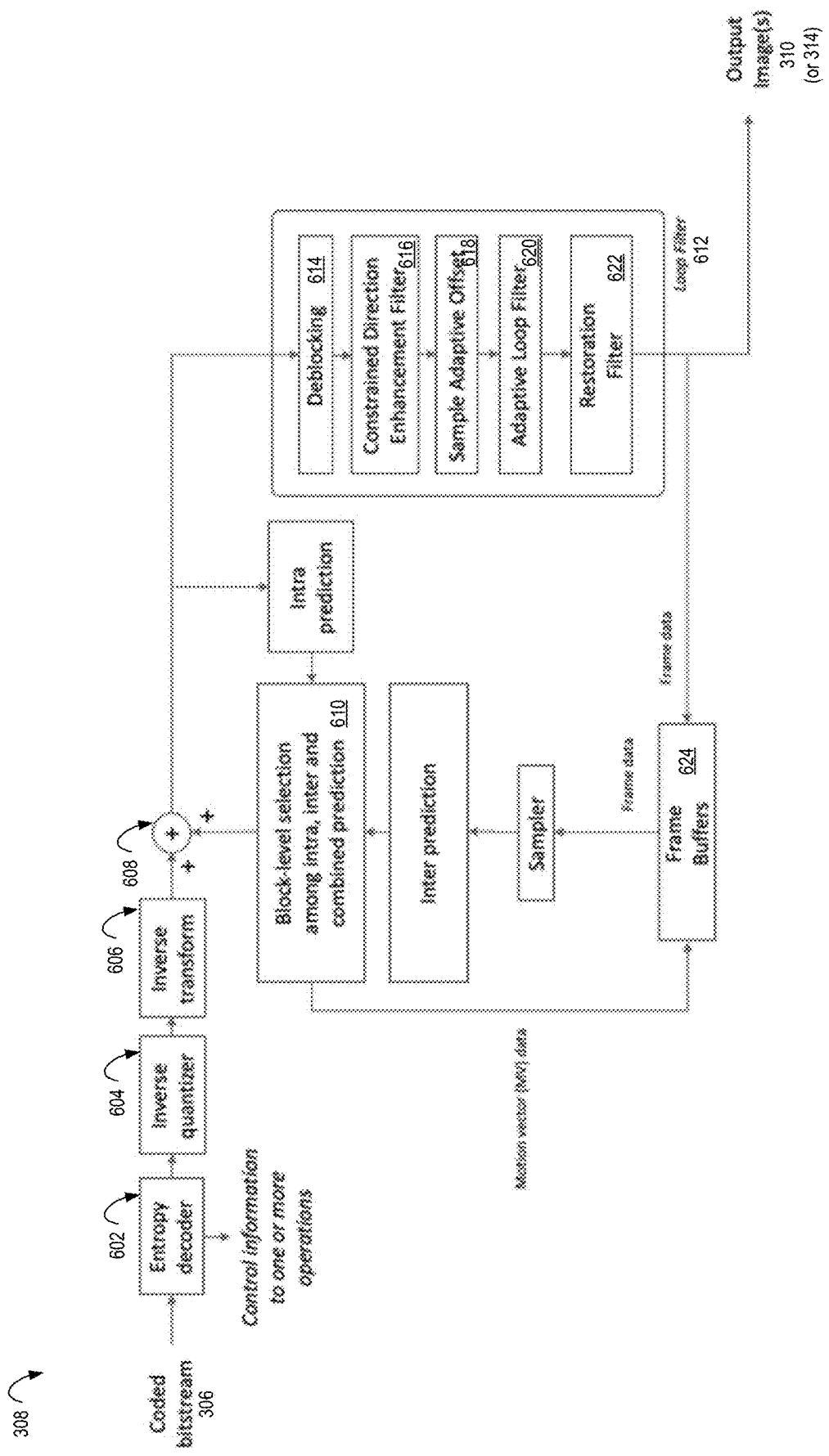
FIG. 6 is a diagram illustrating a video decoder according to some examples.

FIG. 6 is a diagram illustrating a video decoder 308 according to some examples. As described above, in certain examples the video decoder 308 takes a coded bit-stream 306 as input and decodes the bit-stream using an entropy decoder 602. In certain examples, the entropy decoder 602 generates quantized coefficients as output and also control information for other operations within the decoder. In certain examples, the quantized coefficients are inverse quantized at 604 and (optionally) inverse transformed at 606 to generate a residual. In certain examples, the residual is added at 608 to a block-level prediction that is generated by an intra prediction, inter prediction, or combined prediction process 610. In certain examples, following the addition, the resulting sample values are processed by a loop filter 612. Example loop filter 612 operations include one or any combination of deblocking 614, constrained directional enhancement filter (CDEF) 616, sample adaptive offset (e.g., CCSO) 618, adaptive loop filter 620, and/or restoration filter 622. In certain examples, the loop filter output is stored in one or more frame buffers 624, e.g., to be used by the inter prediction process and/or provided as output from the decoder 308. In certain examples where the data stored in the frame buffer 624 does not have the same spatial resolution as a current frame, the data stored in the frame buffer may be resampled by the inter prediction process to the same resolution as the current frame. In certain examples, frame buffer 624 is an instance of buffer 126A in FIG. 1.

Overview

Examples herein are directed to a methods and/or apparatuses (e.g., encoder and/or decoder) for coding video that incorporates an upsampling and super-resolution approach into the coding loop. In certain examples, the method has the benefit of both improving coding efficiency and reducing the reducing the computational complexity of a video compression system. In certain examples, this is accomplished by allowing some coding operations to be performed at different spatial resolutions. In some examples of the method, these different spatial resolutions may change for different frames or pictures. Other key benefits of the approach include: (i) methods for reducing the memory consumption of the decoded picture buffer, (ii) methods to perform motion vector coding and motion compensation between pictures with different spatial resolutions, and (iii) methods for coding residual information at a different spatial resolution than other coding processes.

Video Compression

In certain examples, video compression systems include video encoding and video decoding operations. A video encoder receives one or more images (or equivalently frames or pictures) as input and generates a bit-stream as output. The video decoder receives all or part of the bit-stream as input and generates one or more images as output. These output pictures are similar to the images received by the encoder but may not be identical.

Example video compression systems include H.264, HEVC, VVC, VP9 and AV1. In certain of these systems, the video encoder typically receives an image as input and divides the image into spatial regions for coding. These spatial regions may be referred to as macro-blocks, super-blocks, coding tree units or other terms known to those skilled in the art. The spatial regions are then further partitioned. For example, each super-block in AV1 may be recursively split into coding blocks ranging in size from 128×128 samples to 4×4 samples and with both square and rectangular shapes. For clarity, a sample (or pixel) corresponds to a specific location within a frame. For two-dimensional images, this specific location may be a horizontal and vertical index into the frame image, which stores the value for the image at that index.

In certain examples, each coding block is first predicted using either intra frame prediction, inter frame prediction or a combination of the predictions. Intra frame prediction predicts a current coding block from previously coded and spatially neighboring blocks. This prediction may be done with directional intra prediction that predicts the sample values of the current coding block by extrapolating previously coded information along a prediction direction. The prediction may also be done with non-directional intra-prediction, such as non-directional smooth intra prediction, recursive intra-prediction, intra block copy and color palette techniques.

Inter frame prediction uses information from previously coded frames for prediction. One method for performing this prediction uses a translational motion model. In this approach, the spatial offsets (or motion vectors) between the current coding block and a previously decoded frame are used to translate a region of the previously coded frame and use the translated version for prediction. Different precision for the motion vectors is possible, such as ⅛ pixel motion vector accuracy. And different interpolation filters can also be selected. In addition to a translational motion approach, alternative methods for performing inter frame prediction include affine motion compensation and overlapped block motion compensation. Moreover, one or more of these models may be employed to predict the current coding block from more than one previously coded locations in previously decoded frames. One example is the compound prediction mode in AV1.

Strategies for combining the more than one prediction includes computing a weighted average based on the temporal distance between each previously coded block and the current coded block.

In some video coding systems, it is possible to use a combination of intra frame and inter frame prediction for a current coded block. For example, a coding block may be divided into two regions. And the first region predicted using an intra frame prediction method and the second region using an inter frame prediction region. As a second example, an intra frame prediction and an inter frame prediction may be averaged (e.g., via a weighted average) to predict the current coding block.

Following the prediction of each block, residual information may be added to the prediction. At an encoder, the residual may be computed by calculating the difference between the prediction and the original frame data, applying an optional transform to the difference, and quantizing the coefficients that are output by the transform. At a decoder, the residual is computed by de-quantizing the coefficients computed by an encoder, applying an optional inverse transform the to de-quantized coefficients, and adding the result of the inverse transform to the predicted block. Note that the sequential process of quantization and de-quantization may not result in the same input that was provided to the quantization process. Similarly, the sequential process of a transform followed by an inverse transform may not result in the same input that was provided to the transform.

The reconstructed block corresponding to the addition of the prediction and residual information may then be processed by one or more in-loop filters (or operations). These filters improve the fidelity of the reconstructed blocks and include processes such as deblocking filters, constrained directional enhancement filter, sample adaptive offset filters, adaptive loop filters and loop restoration filters. These operations may use different partitioning than the reconstructed blocks.

One specific example of an in-loop filter is the super-resolution filter (e.g., in an AV1 standard). This super-resolution filter takes samples as input and provides a higher resolution version of the samples in the spatial domain as output. In certain examples (e.g., AV1), the resolution is increased in the horizontal direction only, e.g., and may be increased by up to a factor of two times the input resolution. The result may then be processed by subsequent in-loop filters. The factor of resolution increase may be signaled in the bit-stream by an encoder and received in the bit-stream by a decoder.

The output of the one or more in-loop filters may be stored in a decode picture buffer for use in the inter prediction of coding blocks in different frames. Additionally, the output may be processed by out-of-loop filters to further modify the output.

Examples of these filters include spatial resizing, color conversion, film grain synthesis, and debanding operations. In certain examples, the result is not stored in the decoded picture buffer.

Information computed during the encoding process may be signaled in a bit-stream. For example, the partitioning of regions for coding, intra prediction directions, motion vectors, quantized transform coefficients and in-loop filter control information may be signaled. In certain examples, this information is sent without loss using an entropy coding system. In certain examples (e.g., AV1), the entropy coding system uses a M-ary arithmetic coder. In certain examples (e.g., VVC), the entropy coding system uses a context-adaptive binary arithmetic coder. In certain examples, the information is then extracted from the bit-stream by the decoder.

Problem Statement

Certain aspects of video coding systems are less than ideal. For example, where the residual process is performed prior to a super-resolution process (e.g., where the video is encoded at a lower resolution and then upsampled to a higher resolution during decode) and, so, at a lower resolution. Additionally, inter prediction tools may be disabled for frames that are coded at different resolutions. Furthermore, the need to store frames at multiple resolutions requires additional memory and is undesirable. Additionally, the in-loop super-resolution algorithms are limited to one dimension, for example, an AV1 standard that only applies upsampling and/or downsampling in the horizontal (e.g., as viewed) direction, e.g., does not (e.g., ever) apply upsampling and/or downsampling in the vertical (e.g., as viewed) direction. In certain examples, out-of-loop resizing is not limited to one dimension, but the use of out-of-loop resizing does not ensure a consistent visual quality output and does not allow for the coding of residual at a higher resolution.

Figure 7:
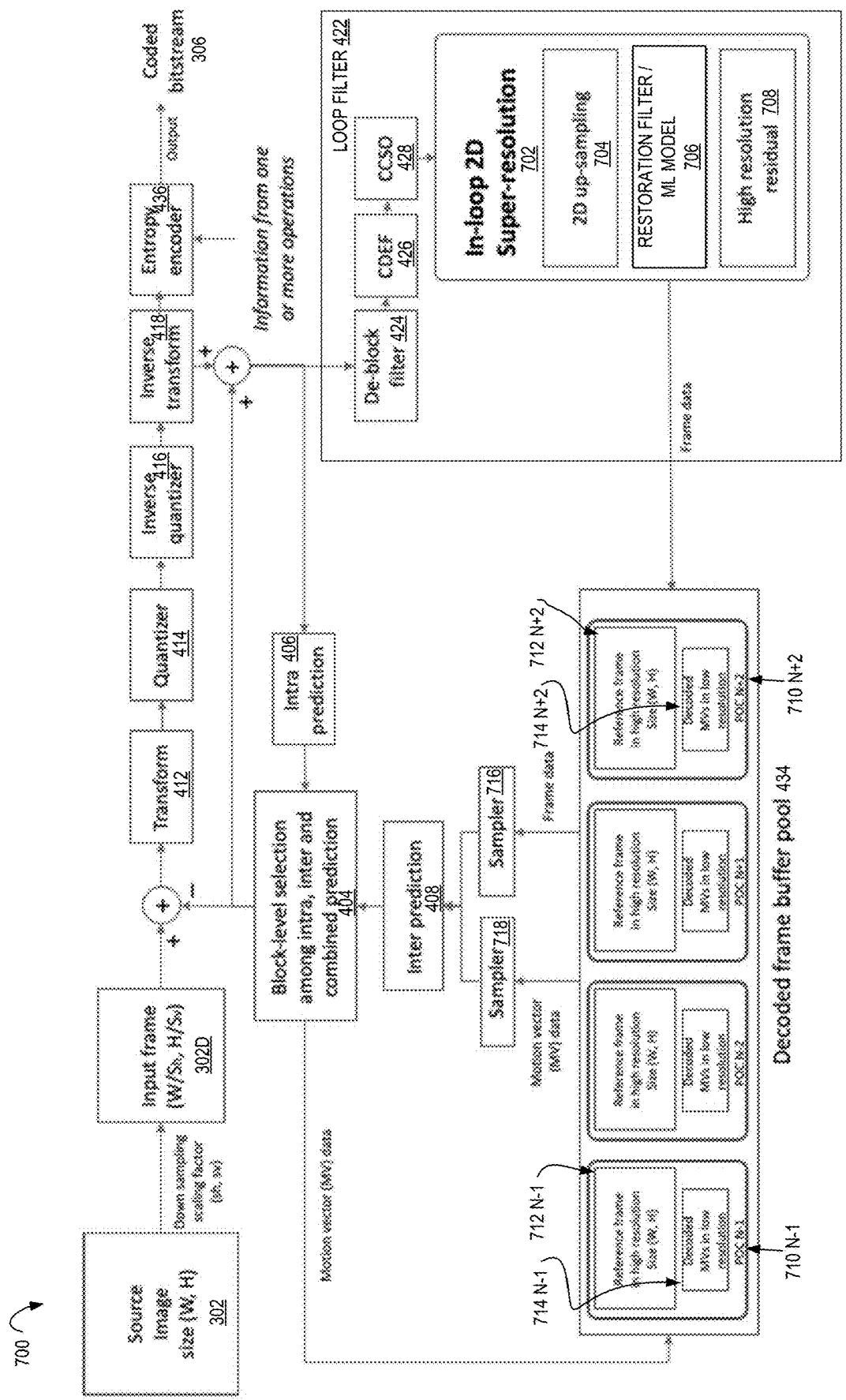
FIG. 7 is a diagram illustrating a video encoding that includes in-loop two-dimensional (2D) super-resolution operations with a 2D upsampling operation and a high-resolution residual operation according to some examples.

Certain examples herein are directed to multi-resolution coding method. FIG. 7 is a diagram illustrating a video encoding 700 that includes in-loop two-dimensional (2D) super-resolution operations 702 with a 2D upsampling operation 704 and a high-resolution residual operation 708 according to some examples.

FIG. 7 illustrates one example of the video encoding operation. As can be seen from FIG. 7, the method includes several operations. First, a source image 302 is down-sampled to generate an input frame 302D with lower spatial resolution, e.g., in the vertical (e.g., height) direction (e.g., according to a vertical scaling factor "Sv") and (optionally) in the horizontal (e.g., width) direction (e.g., according to a horizontal scaling factor "Sh", which may or not be the same as the Sv). In certain examples, the input frame 302D is then partitioned into blocks, and each block is predicted 404 using either an intra prediction 406, inter prediction 408, or a combination of the two. In certain examples, the difference between the input frame and the predicted block is calculated, and the difference is transformed at 412 and quantized at 414 to generate quantized coefficients. In certain examples, these quantized coefficients are inverse quantized at 416, inverse transformed at 418, and added to the prediction to generate the predicted with residual image. In certain examples, the predicted with residual image is then processed by an optional loop filter 422, which may include a de-blocking filter 424, a constrained directional enhancement filter (CDEF) 426, and a cross component sample offset (CCSO) filter 428. In certain examples, the output of the loop filter operation is input to a two-dimensional upsampling operation 704 followed by in-loop restoration 706 and high residual 708 data operations, e.g., of in-loop two-dimensional (2D) super-resolution operations 702. In certain examples, the information from one or more of the operations in the method are provided as input to an entropy encoder 436, which produces the output coded bit-stream 306. Examples of this information include the partitioning used for prediction, the motion vectors used for inter-prediction, the direction information for intra-prediction, the transform type, the quantization parameter, the quantized transform values, the deblocking filter strength, the CDEF filter parameters, the CCSO filter parameters, the super-resolution sampling factor, the restoration filter parameters, and/or the high-resolution residual data parameters. In certain examples, the high-resolution residual data parameters includes one or any combination of the coded residual data at high-resolution after a processing transform, a quantization, and/or an entropy coding.

In certain examples, the frame data 712 (shown as 712 N−1, 712 N−2, 712 N+1, and 712 N+2 for four frames that are labeled with picture order count (POC) value of N−1, N−2, N+1, and N+2, respectively) resulting from the high-resolution residual data operation 708 in FIG. 7 (e.g., the encoding structure with the in-loop 2D super-resolution 702 with residual frame encoding) is stored in a decoded picture buffer 434. In certain examples, the decoded picture buffer 434 is an instance of the reference picture buffer 110A and/or the reference picture buffer 126A in FIG. 1. Additionally, in certain examples, the motion vectors 714 (shown as 714 N−1, 714 N−2, 714 N+1, and 714 N+2 for four frames that are labeled with picture order count (POC) value of N−1, N−2, N+1, and N+2, respectively) from the block-level selection process are also stored in the decoded picture buffer 434 in certain examples. Although four reference frames are shown in decoded picture buffer 434 in FIG. 7, it should be understood that other values are possible. In certain methods, the motion information may correspond to the operating resolution of the codec, e.g., prior to super-resolution. The frame data and motion vector data may therefore correspond to different spatial resolutions. Moreover, the frame data and motion vectors data may be used by the inter-prediction process in future frames. And these future frames may correspond to a resolution different than either of the stored frame data or motion vector data. When the frame data and motion information are used for inter prediction of future frames, the frame data and motion information are independently resized using two samplers. In certain examples, a motion vector specifies the offset relative to another (e.g., previous) frame to use as a prediction for the current frame (e.g., current block), e.g., a motion vector that contains information about both a vertical and horizontal offset to allow for both types of movement. In certain examples, for intra blocks, the decoding process works by first computing the prediction, and then inverse transforming the transform coefficients and adding the result (the residual) to this prediction. In certain examples, the motion vectors specify shifts in units of whole pixels or other shifts (e.g., a fractional pixel offset). In certain examples, when a fractional pixel shift is used, the previous frame is filtered in order to give a more accurate prediction.

Figure 8:
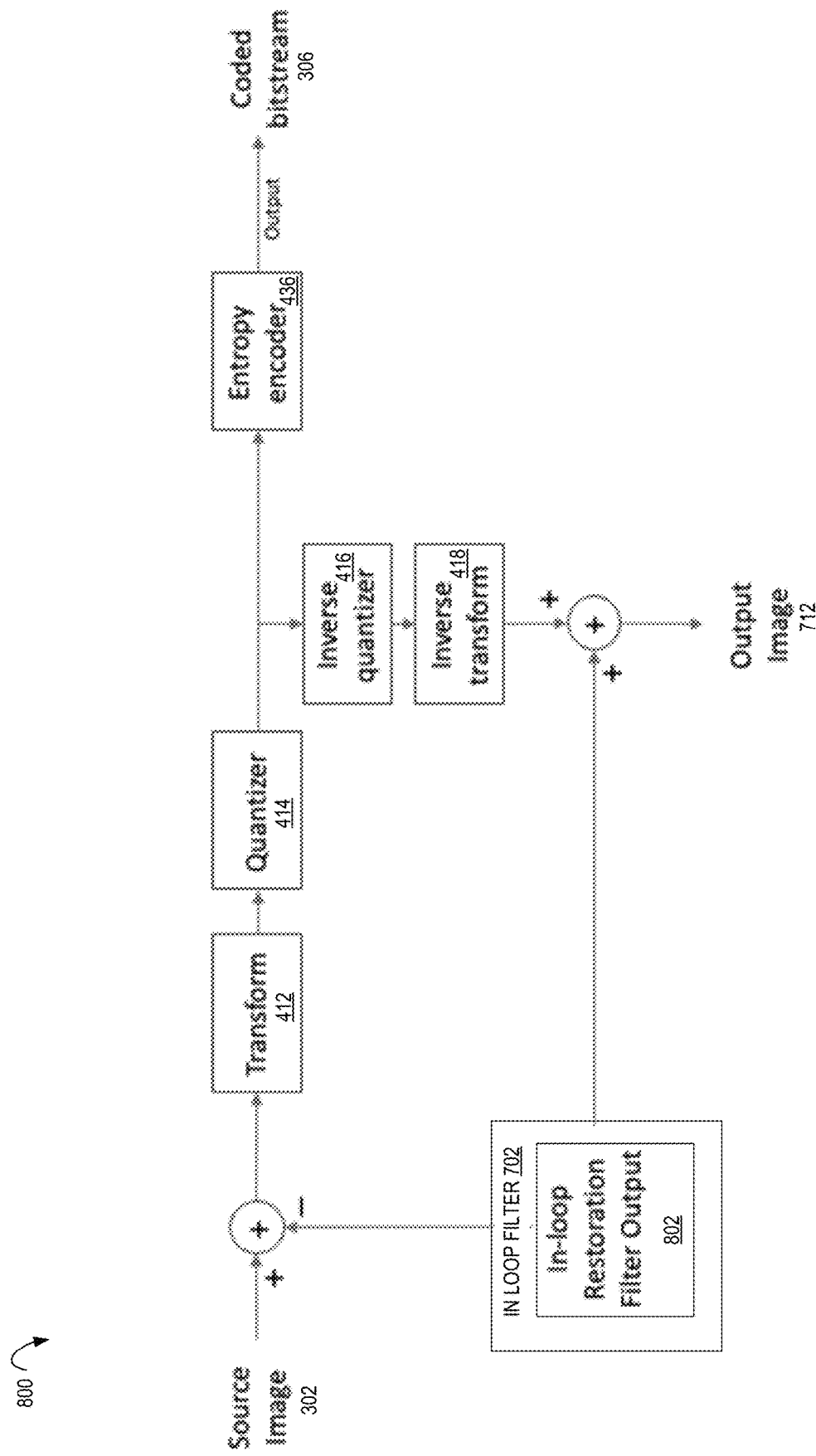
FIG. 8 is a diagram illustrating a high-resolution residual operation in an encoder according to some examples.

FIG. 8 is a diagram illustrating a high-resolution residual operation 800 in an encoder according to some examples. In certain example, the high-resolution residual operation 800 is an instance of high-resolution residual data operation 708 in FIG. 7. FIG. 8 illustrates one example of the high-resolution residual operation in a video encoder. As can be seen in FIG. 8, in certain examples the operation 800 takes the source image 302 (e.g., in the original resolution or resolution that is lower than the original resolution) and in-loop restoration frame 802 as input, e.g., frame 802 output from in-loop filter 702. In certain examples, the difference is calculated, transformed at 412, and quantized at 414. In certain examples, the quantized result is then processed by an inverse quantizer 416 and inverse transform 418 and then added to the in-loop restoration frame input 802 to generate the high-resolution residual output (for example, as a resultant, e.g., the resultant in examples 8-27 below). In certain examples, the quantized coefficients and other information from the transform and quantizer operations are output to an entropy encoder 436, e.g., which includes them when creating an output bit-stream 306. In one or another example of the disclosure, the calculated difference may be partitioned into blocks. The high-resolution residual operation 800 may take other images as input instead of the source image and in-loop restoration frame. For example, it may take the source image and two-dimensional output frame as input. Or it may take an image derived from the source image and the in-loop restoration frame as input.

Figure 9:
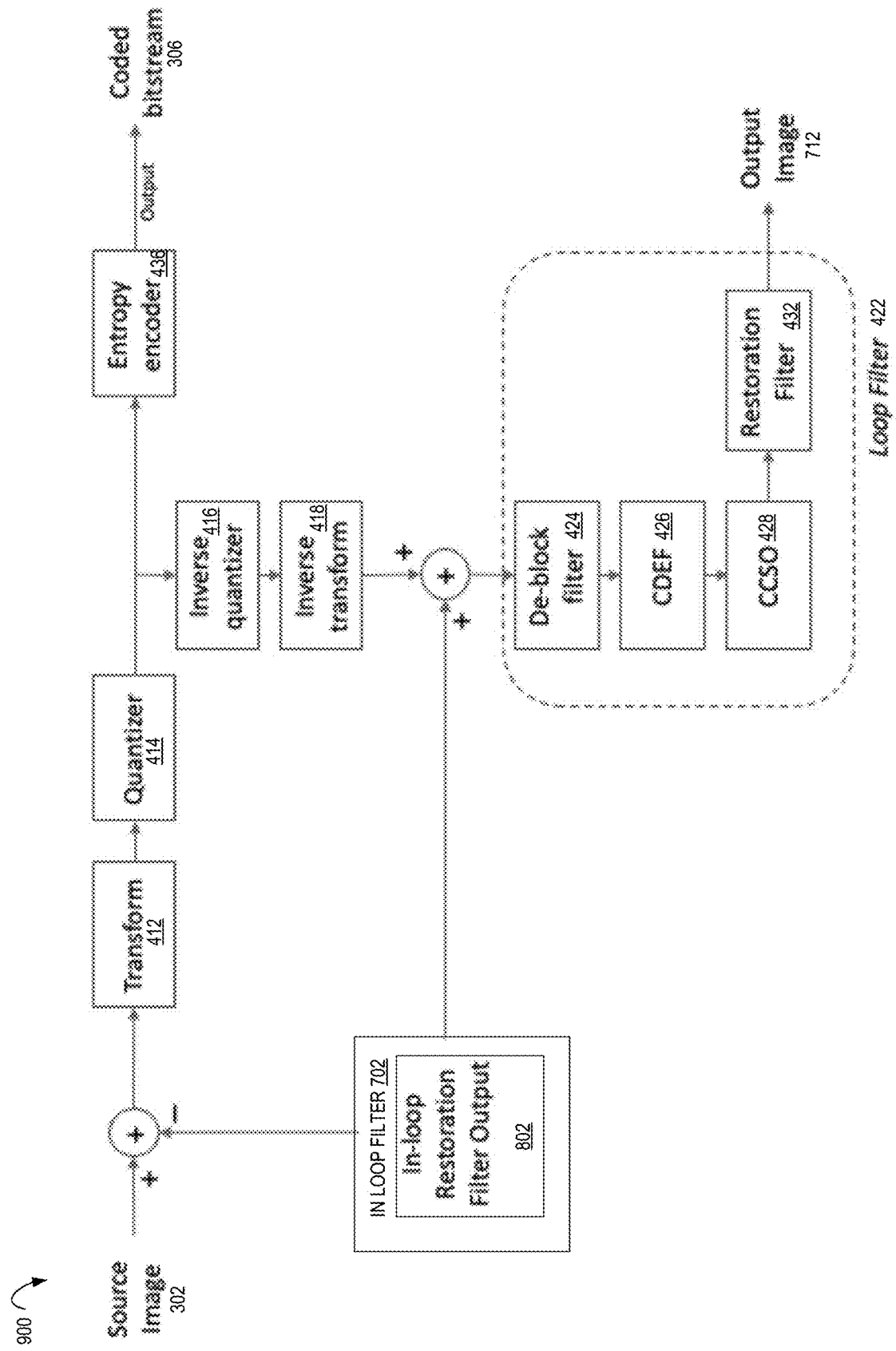
FIG. 9 is a diagram illustrating another high-resolution residual operation with a loop filter operation in an encoder according to some examples.

FIG. 9 is a diagram illustrating another high-resolution residual operation 900 with a loop filter operation 422 in an encoder according to some examples. FIG. 9 illustrates another example of the high-resolution residual operation. In certain example, the high-resolution residual operation 900 is an instance of high-resolution residual data operation 708 in FIG. 7. As can be seen in FIG. 9, in certain examples the operation performs one or more loop filter operations 422 after the output of the inverse transform 418 is added to the in-loop restoration result 802 (e.g., frame) output from in-loop filter 702. In one example, the loop filter operations 422 consist of one or more of a de-blocking filter 424, CDEF filter 426, CCSO filter 428, and/or restoration filter 432. In another example, the loop filter operations 422 are performed on the output of the inverse transform 418 and then added to the in-loop restoration result 802.

In one example of the disclosure, the two-dimensional upsampling operation at 702 (e.g., two-dimensional upsampling operation 704 in FIG. 7) changes the spatial resolution of a picture. In one or another example, the operation uses a filter to increase the resolution. This may include a two-dimensional filter or a separable, two-dimensional filter. In another example, the operation uses a neural network (e.g., as an instance of ML model 112, such as, but not limited to, restoration ML model 706 or restoration ML model 1006) to increase the resolution. In another example, to eliminate undesired aliasing effects, a smooth filtering may be applied to the input pixels before upsampling. In an example, the upsampling operation may use different scaling factors for each dimension. For example, the vertical sampling ratio may be equal to four and the horizontal sampling ratio is equal to two. One or more scaling factors may be included in the bit-stream and signaled on a block, picture, and/or sequence level. In one example of the disclosure, the sampling process may be integrated into the interpolation process for motion compensated prediction for inter-prediction.

Figure 10:
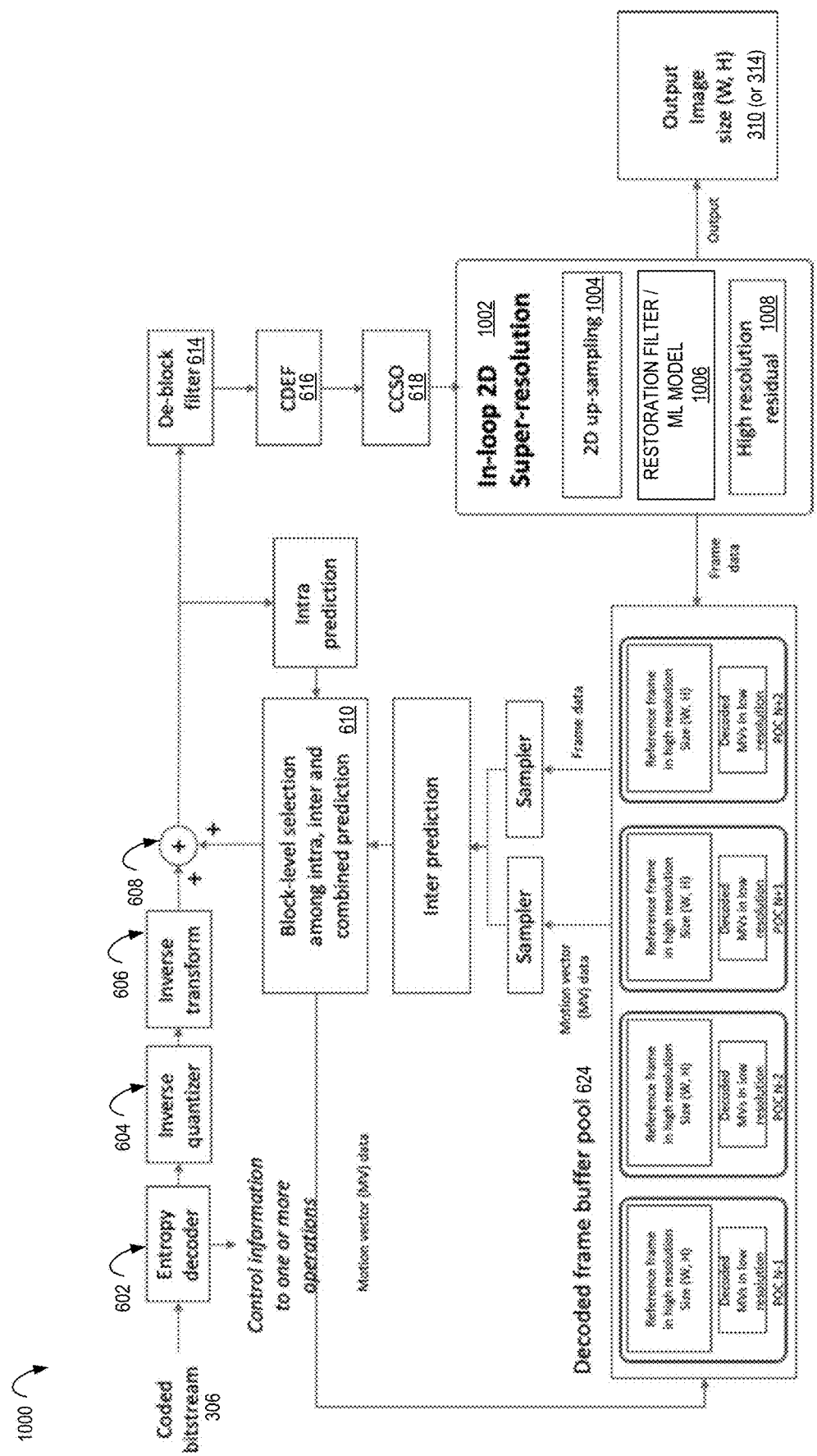
FIG. 10 is a diagram illustrating a video decoding that includes in-loop two-dimensional (2D) super-resolution operations with a 2D upsampling operation and a high-resolution residual operation according to some examples.

FIG. 10 is a diagram illustrating a video decoding 1000 that includes in-loop two-dimensional (2D) super-resolution operations 1002 with a 2D upsampling operation 1004 and a high-resolution residual operation 1008 according to some examples. FIG. 10 (the decoding structure with the in-loop 2D super-resolution with residual frame encoding) illustrates one example of the video decoding operation. As can be seen from FIG. 10, in certain examples an entropy decoder 602 takes the coded bit-stream 306 as input and generates quantized transform coefficients and control information as output. In certain examples, the quantized transform coefficients are inverse quantized at 604 and inverse transformed at 606, and the result is added to a prediction 610 generated by an intra prediction, inter prediction, or combined prediction process. In certain examples, the result of the addition is provided as output to one or more filters, e.g., a deblocking filter 614, a CDEF 616, and/or a CCSO 618. In certain examples, the output of the filter operation is input to a two-dimensional upsampling operation (e.g., process) 1004 followed by in-loop restoration (e.g., restoration filter) 1006 and high-resolution residual operation 1008, e.g., of in-loop two-dimensional (2D) super-resolution operations 1002. In certain examples, the result of the high-resolution residual operation 1008 is an image 310 (or 314) output by the video decoding operation. In certain examples, this output is (e.g., also) stored in a decoded frame buffer pool 624, e.g., for the inter prediction of other frames. In certain examples, motion vector information is also stored in the buffer, e.g., and the resolution of the motion vector information and frame data do not correspond to the same spatial resolution (for example, as discussed in reference to FIG. 7). In certain examples, this is because the motion information is used to predict samples prior to the two-dimensional upsampling operation and the frame data corresponds to samples following the two-dimensional upsampling operation.

In certain examples, scalars take this motion vector information and frame data as input and adjust the resolution of the information and data when used by the inter prediction module.

Figure 11:
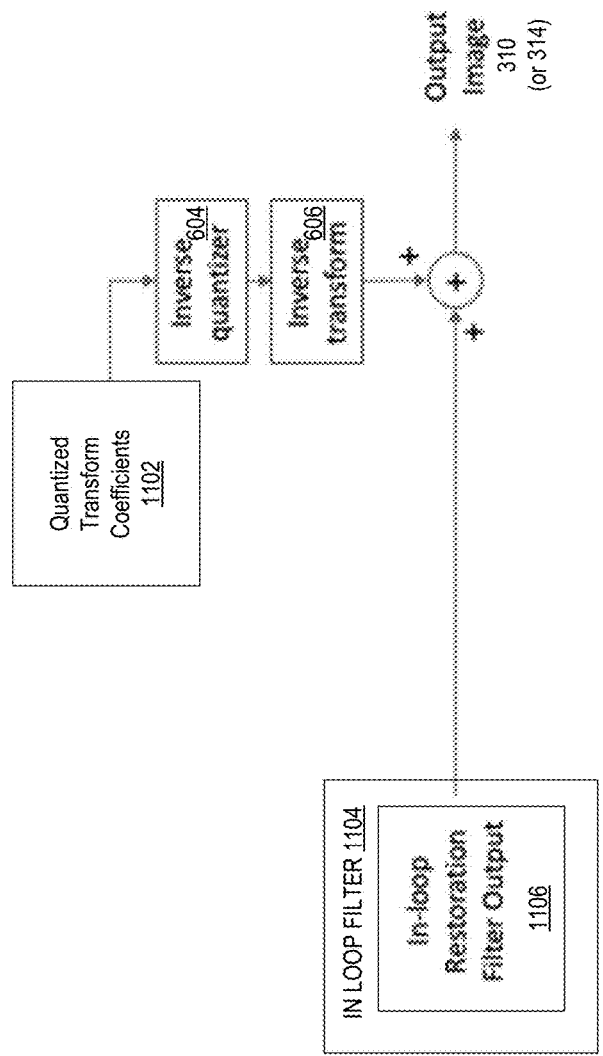
FIG. 11 is a diagram illustrating a high-resolution residual operation in a decoder according to some examples.

FIG. 11 is a diagram illustrating a high-resolution residual operation 1100 in a decoder according to some examples. In certain example, the high-resolution residual operation 800 is an instance of high-resolution residual data operation 1008 in FIG. 10. FIG. 11 illustrates one example of the high-resolution residual operation 1100 in a video decoder. As can be seen in FIG. 11, the operation 1100 takes quantized transform coefficients 1102 (e.g., from coded bitstream 306) as input. In certain examples, the quantized transform coefficients 1102 are processed by an inverse quantizer 604 and an inverse transform 606 and then the results (e.g., pixel values) are added to the in-loop restoration frame output 1106 (e.g., output from in-loop filter 1104 (e.g., as an instance of restoration filter/ML model 1006)) to generate the high-resolution residual output, e.g., as image 310 (or 314). In certain examples, the blocks in the high-resolution residual operation may also receive control information from an entropy decoder (e.g., entropy decoder 602 in FIG. 6) in a video decoder.

Figure 12:
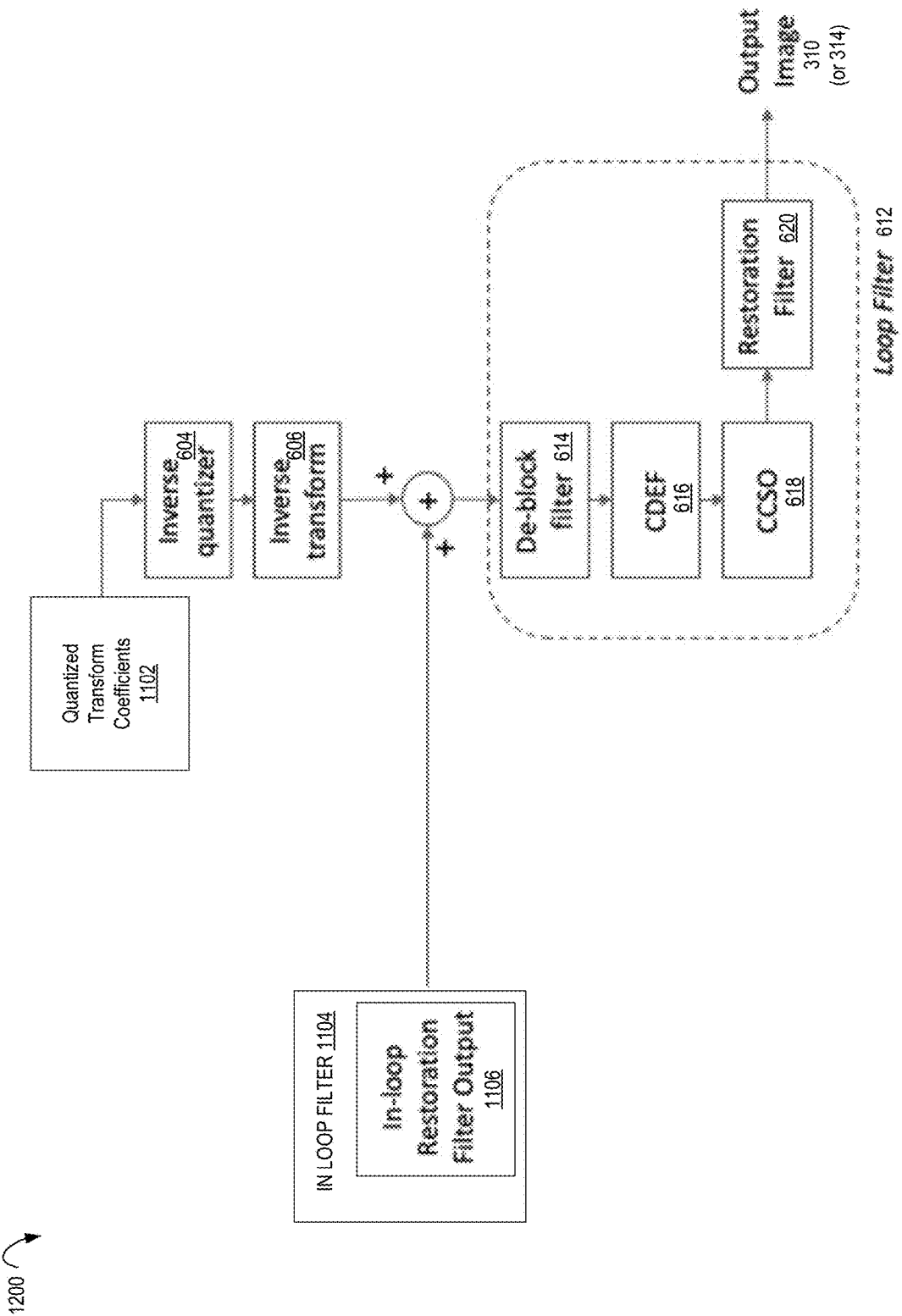
FIG. 12 is a diagram illustrating another high-resolution residual operation with a loop filter operation in a decoder according to some examples.

FIG. 12 illustrates another example of the high-resolution residual operation 1200 in a decoder. In certain example, the high-resolution residual operation 1200 is an instance of high-resolution residual data operation 708 in FIG. 7 As can be seen in FIG. 12, in certain examples the operation 1200 adds the output of the inverse transform 606 and in-loop restoration filter 1106 output. In certain examples, the result is then processed with one or more loop filters 612. Example loop filters include a deblocking filter 614, a CDEF 616, a CCSO 618, and/or a restoration filter 620. In certain examples, the output of the one or more loop filters 612 corresponds to the high-resolution residual output. In one or another example, the loop filters 612 are controlled by information received in a coded bit-stream. In one or another example of the video encoder or video decoder described above, the restoration filtering step 620 may use two-dimensional filters or neural network operations when processing the image data. The filter shape and coefficients may be pre-defined, implicitly derived during decoding or fully or partially signaled in a bitstream. In an example, one or more neural network based inference processes are applied to the in-loop restoration process. In the same example, the topology and coefficients of the neural network model may be fully or partially contained in a bitstream.

In one or another example of the video encoder or video decoder described above, the high-resolution residual data is coded using an existing video standard. In another example, the residual data is coded using an existing video standard that is constrained with the constraint that the residual frame is coded using inter-prediction only by using the output of the restoration operation as the reference frame. In certain examples, the motion vector related signaling is skipped by implicitly deriving all motion vector as a default value (e.g., zero motion vector). In certain examples, the coded residual data is added to the bitstream, e.g., only when adding the residual data can improve both subjective and objective visual quality. In certain examples, the output frame of the 2D super-resolution (SR) processing is output as a rendered image and/or stored in a decoded frame buffer in the pool to be used as a reference frame of the following frames in decoding order. In another example, additional in-loop filters including, but not limited to, de-blocking filter, CDEF and CCSO, are processed after decoding and adding the residual frame data.

In certain examples, the multi-resolution coding method stores decoded picture and motion vector information in a decoded picture buffer. In one example, this information is combined into a so-called frame unit.

Figure 13:
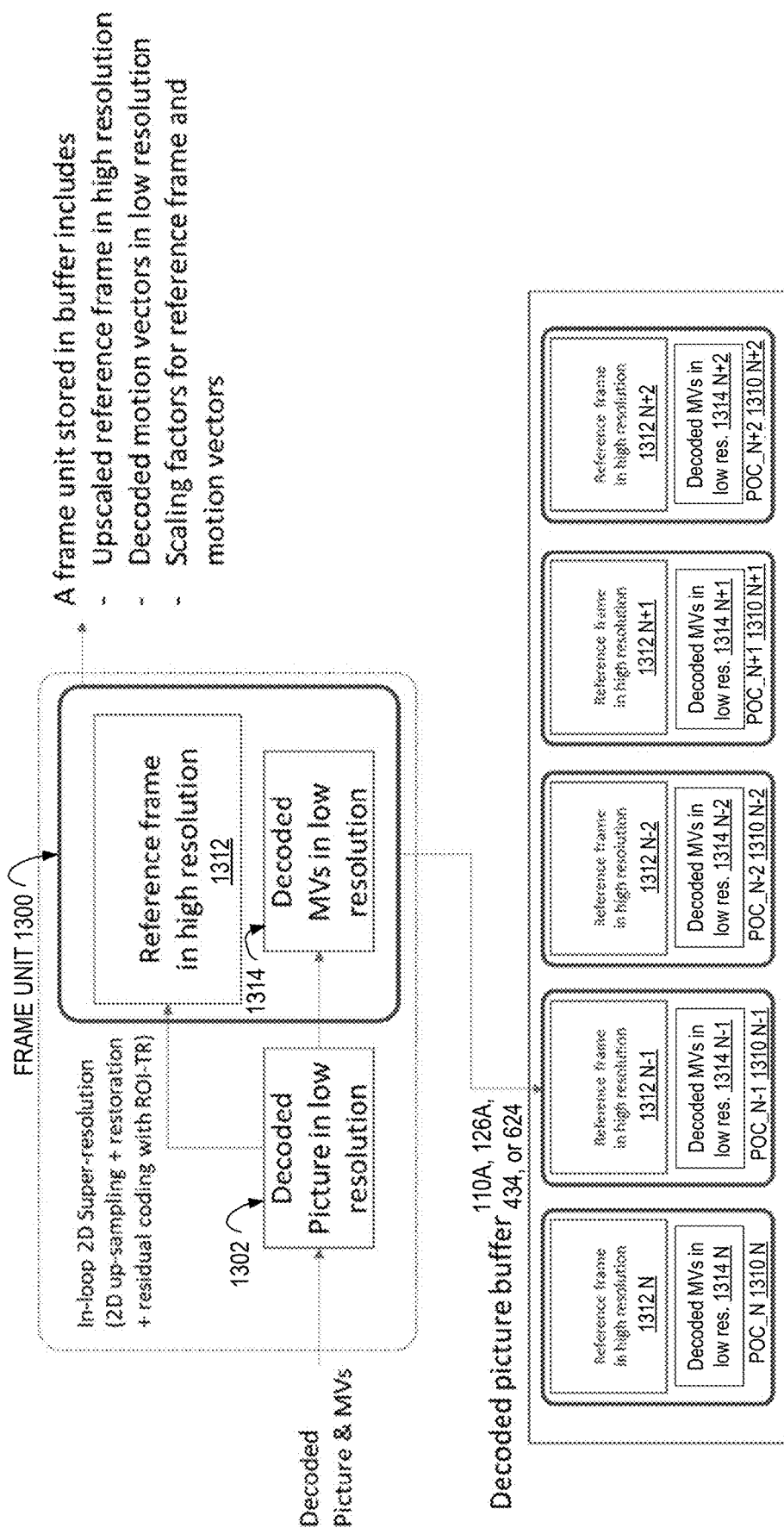
FIG. 13 is a diagram illustrating a decoded picture buffer with a plurality of frame units stored therein according to some examples.

FIG. 13 is a diagram illustrating a decoded picture buffer (e.g., buffer 110A, 126A, 434, and/or 624) with a plurality of frame units (e.g., POC "N" 1310 N, POC "N–1" 1310 N–1, POC "N–2" 1310 N–2, POC "N+1" 1310 N+1, and POC "N+2" 1310 N+2) stored therein according to some examples. In certain examples, N is a (e.g., current) frame and N–1 is the frame immediately before frame N in display order, N–2 is the frame before frame N–1 in display order, and N+1 is the frame immediately after frame N in display order, and N+2 is the frame immediately after frame N+2 in display order. In certain examples, the decoded picture in the low resolution 1302 is not stored in the decoded picture buffer, e.g., is not part of a frame unit 1300.

An example frame unit (e.g., format) is shown in FIG. 13 (decoded picture buffer pool with frame units) and contains the output frame 1312 ("reference frame") of the super-resolution processing in higher-resolution and the decoded motion vector(s) 1314 in lower-resolution. In certain examples, the frame unit 1300 may be used as a reference unit of one or more following (or preceding) pictures in decoding order. In an additional example, the scaling factor used for super-resolution may also be stored with the frame unit. The scaling factor may be used to determine the interpolation factor of motion compensation process.

In certain examples, the motion vectors 1314 (shown as 1314 N, 1314 N–1, 1314 N–2, 1314 N+1, and 1314 N+2 for the five frames that are labeled with picture order count (POC) value of N, N–1, N–2, N+1, and N+2, respectively) are also stored in each frame unit of the decoded picture buffer. Although five reference frames are shown in decoded picture buffer in FIG. 13, it should be understood that other values are possible.

Figure 14:
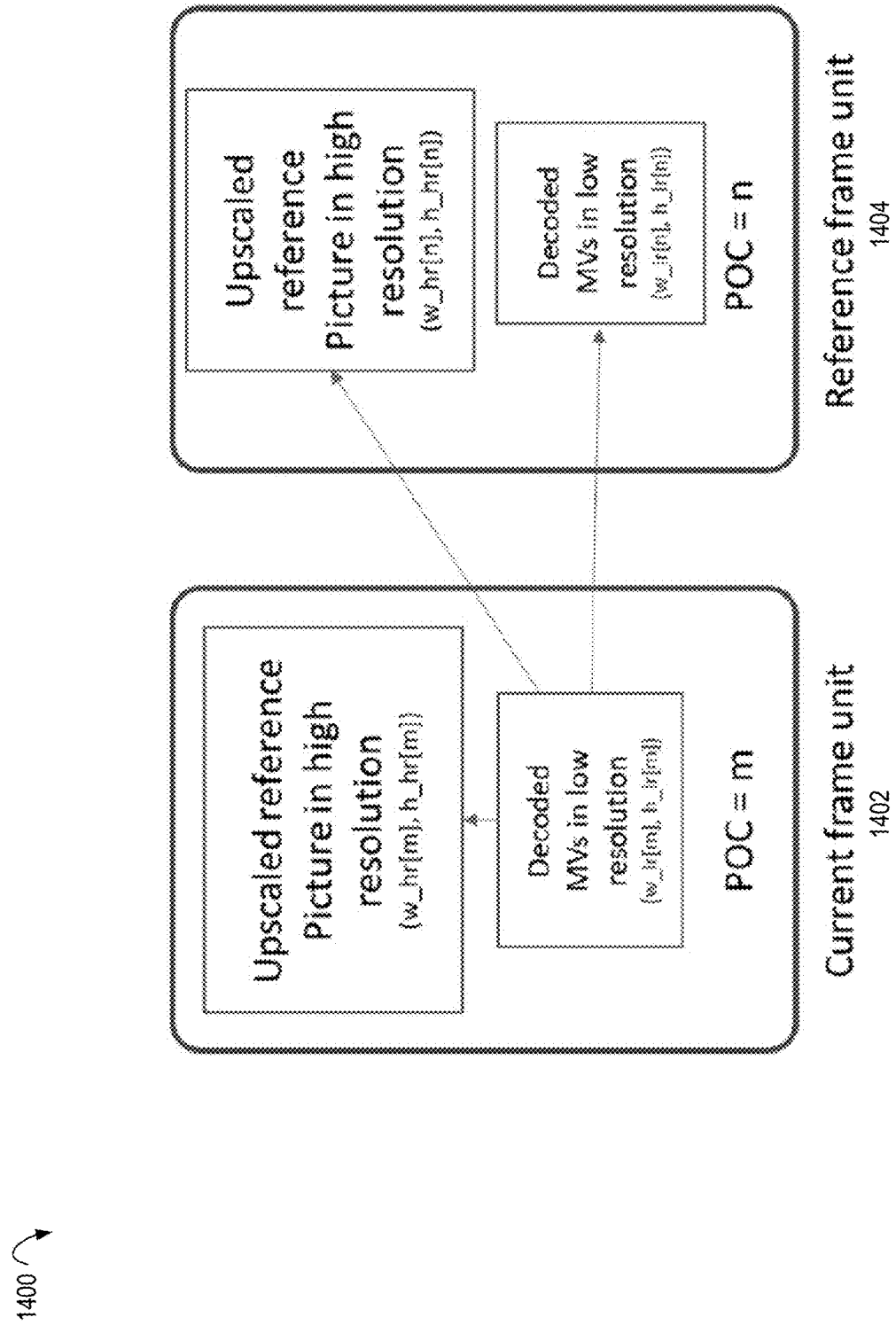
FIG. 14 is a diagram illustrating a current frame unit and a reference frame unit according to some examples.

In an example, the method may use a scaling process with one or more scaling factors for motion compensated prediction. FIG. 14 is a diagram 1400 illustrating a current frame unit 1402 and a reference frame unit 1404 according to some examples. As shown in FIG. 14 (scaling the decoded pictures and motion vectors for super-resolution and interprediction), there may be three different scaling factors. A first one is the scaling factor between the decoded picture before the super-resolution processing in low-resolution and the output picture of the super-resolution. The scaling factor may be used for the super-resolution process. A second one is the scaling factor between the decoded picture and a reference frame. The scaling factor may be used for interpolation process for motion compensation. In the same or another example, each reference picture may have a spatial resolution different from the decoded picture. A third one is the scaling factor between the motion vector of the currently decoded picture and the motion vector of a reference frame unit. The scaling factor may be used for a temporal motion vector prediction.

Figure 15:
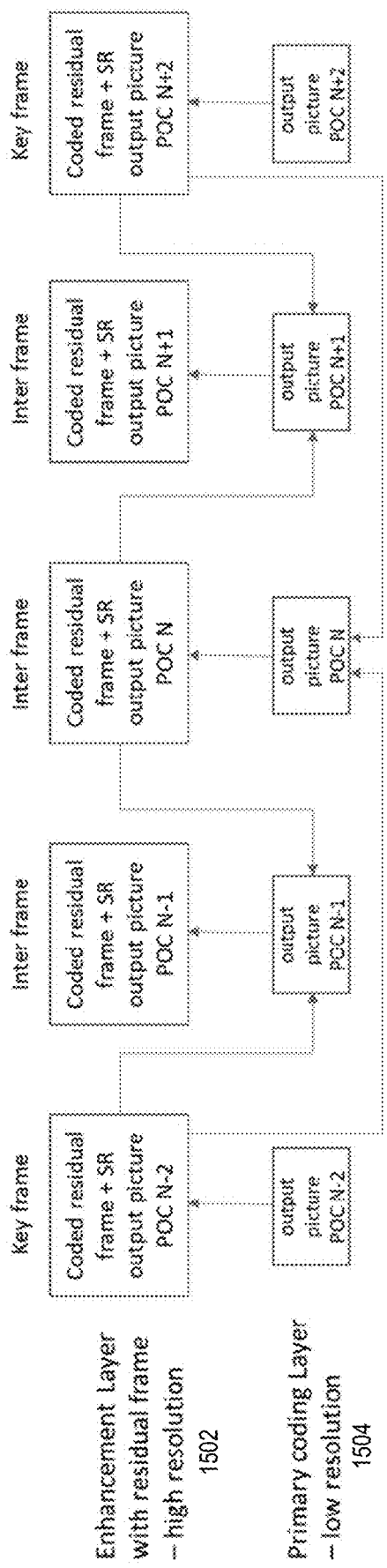
FIG. 15 is a diagram illustrating a prediction structure with frame units according to some examples.

FIG. 15 is a diagram illustrating a prediction structure 1500 with frame units according to some examples. In an example, the multi-resolution method may use the prediction structure in FIG. 15 (the prediction structure with frame units) for coding. In certain examples, the decoded picture buffer would store the high-resolution information frame data 1502 output by the super-resolution high-resolution residual process, e.g., and it would include the low-resolution motion vectors that are used as references of the motion compensation for the following frames in decoding order. Compared to the layered coding in other video coding standards, which stores both low-resolution decoded frames and high-resolution ones in the buffer pool, certain examples herein reduce the storage buffer size by only storing the high-resolution frames. Moreover, in certain examples this reduces the number of frames that need to be stored in the buffer, which reduces the number of bits required to indicate what picture to use for prediction. In certain examples, lower resolution frame data 1504 is the data that is in a lower resolution (e.g., lower than the resolution of the super-resolution picture and/or the coded residual frame). In certain examples, the lower resolution frame data 1504 includes motion vector(s) for the lower resolution, sample values for the lower resolution, inter-coded values for the lower resolution, intra-coded values for the lower resolution, etc. In certain examples, the lower resolution frame data 1504 is fed into a super-resolution operation, e.g., to generate high-resolution information frame data 1502.

In an example, residual information that is not used for the prediction of other pictures may be discarded to adjust the bit-rate. The use of residual frames may be dependent on the rate-distortion performance in encoding.

Figure 16:
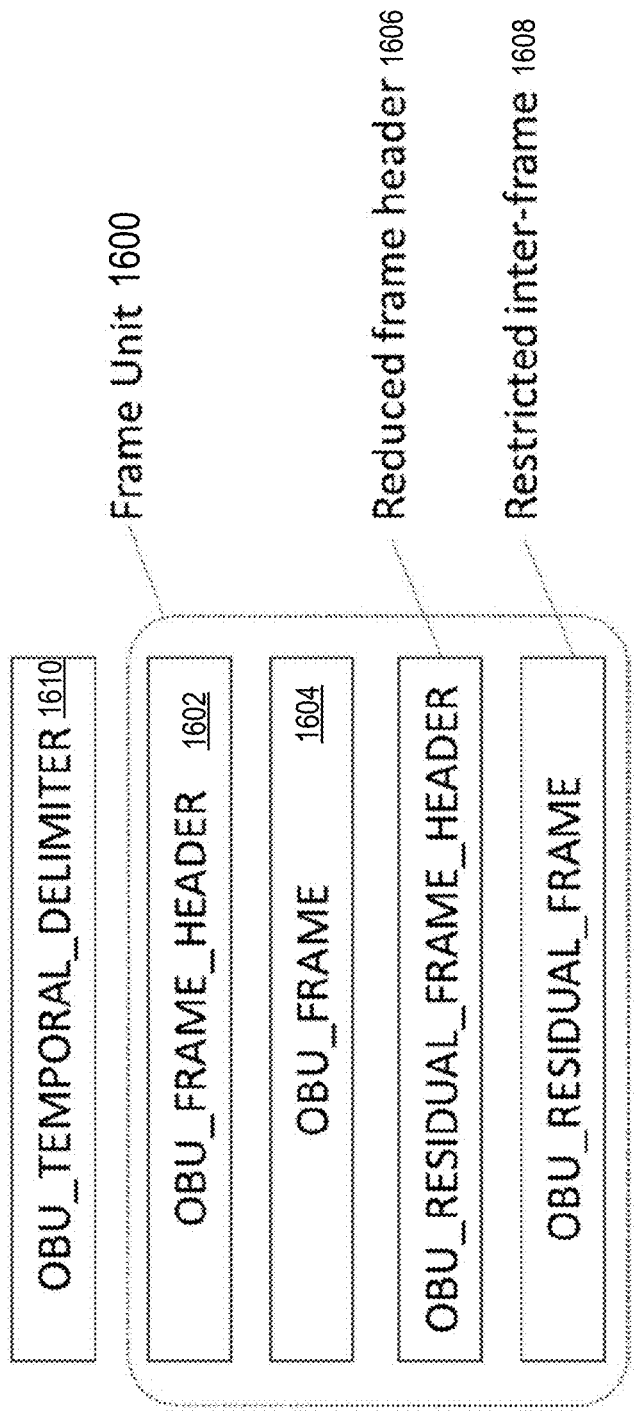
FIG. 16 is a diagram illustrating a frame unit bitstream structure according to some examples.

FIG. 16 is a diagram illustrating a frame unit 1600 bitstream structure according to some examples. For example, in certain standards (e.g., AV1), after signaling one or more frame headers and coded data, one or more associated residual frame headers and coded data may be signaled in a bitstream. In certain examples, the header and the coded data of a residual frame may be contained into a unit (e.g., Open Bitstream Unit (OBU) or Network Abstraction Layer (NAL) unit) or separately contained into each unit. In an example, a frame unit contains one or more frames and one or more associated residual frames. In certain examples, temporal delimiter 1610 field (e.g., 3 bytes) indicates which frame that a particular OBU or OBUs belong to (e.g., as a boundary indicator for a frame). For example, where the temporal delimiter 1610 value changing from a first value for a first frame to a second value indicates that an OBU associated with the changed delimiter 1610 is for a second (different) frame. In certain examples, the temporal delimiter OBU is an empty OBU which does not have any payload, but has only an OBU header. In certain examples, a temporal unit may consist of multiple OBUs, which are associated with a coded frame. In certain examples, the first OBU of a temporal unit is a temporal delimiter OBU. In certain examples, a decoder identifies the Temporal Unit boundary by parsing the OBU header of a temporal unit.

In the same or another example, a coded frame unit 1600 in a bitstream consists of four OBUs—OBU_FRAME_HEADER 1602, OBU_FRAME 1604, OBU_RESIDUAL_FRAME_HEADER 1602, and OBU_RESIDUAL_FRAME 1608. In certain examples, the OBU with obu_type equal to OBU_RESIDUAL_FRAME_HEADER 1606 contains the residual frame header information, and the OBU with obu_type equal to OBU_RESIDUAL_FRAME 1608 contains an inter-coded picture of the residual data between the original input picture and the reconstructed picture of the previously decoded picture whose frame_id or picture order count (POC) is equal to the current frame_id or POC. In certain examples, a syntax format is according to an Alliance for Open Media (AOMedia) standard.

FIG. 17 is a diagram illustrating open bitstream unit (OBU) data structure types 1700 with a residual frame header type and a residual frame type according to some examples, e.g., where OBU_type specifies the type of data structure contained in the OBU payload and/or reserved units are ignored by a (e.g., AV1) decoder) shows an example of OBU header semantics with the new OBU types, OBU_RESIDUAL_FRAME_HEADER and OBU_RESIDUAL_FRAME.

FIG. 18 is a diagram illustrating an OBU syntax 1800 with a residual frame header type and a residual frame type according to some examples. FIG. 18 (an example of OBU syntax with residual frame header and residual frame) shows an example of OBU syntax structure with the new OBU types, OBU_RESIDUAL_FRAME_HEADER and OBU_RESIDUAL_FRAME. In certain examples, depending on the value of OBU type, the residual frame and residual frame header OBUs are identified. The following describes three example mechanisms to signal the primary frame, the residual frame data, and the residual frame header. 1. In certain examples, the primary frame is contained in one or more OBUs, the residual frame data is contained in one or more OBUs, and the residual frame header is contained in one OBU, separately. 2. In certain examples, the primary frame is contained in one or more OBUs, the residual frame data is contained in one or more OBUs, and the residual frame header is included in one of the residual frame data OBUs. 3. In certain examples, all primary frame, residual frame data, and residual frame header are contained the same one or more OBUs.

In the same or another example, some syntax elements of the header of the residual frame may not be signaled in the bitstream and implicitly derived from its associated frame header. A flag or indicator may be signaled to indicate whether some syntax elements of the header of the residual frame are skipped or not in the bitstream. This has the benefit of reducing decoder complexity and improving coding efficiency.

As an example, FIGS. 19-23 (examples of the syntax and semantics of the reduced residual frame header) show syntax structures in the reduced frame header of a coded residual frame. In these examples, some syntax elements associated with the residual frame header are not explicitly signaled in the corresponding OBU. Instead, they are implicitly derived from the values of syntax elements or parameters of the frame header associated with the residual frame. The referenced frame header may be contained in the same frame unit or may be skipped and from the frame header of the primary frame or, alternatively, predicted from a frame header specified by an indicator (e.g., display order value).

FIG. 19 is a diagram illustrating an OBU uncompressed header syntax 1900 according to some examples.

FIG. 20 is a diagram illustrating an OBU frame size syntax 2000 according to some examples.

FIG. 21 is a diagram illustrating an OBU render size syntax 2100 according to some examples.

FIG. 22 is a diagram illustrating an OBU super-resolution parameters syntax 2200 according to some examples.

FIG. 23 is a diagram illustrating an OBU compute image size syntax 2300 according to some examples.

In the same or another example, the super-resolution scaling parameters may be separately signaled for each dimension (horizontal (e.g., X), vertical (e.g., Y)).

Examples semantics include:
show_existing_frame equal to 1, indicates the frame indexed by frame_to_show_map_idx is to be output; show_existing_frame equal to 0 indicates that further processing is required.
frame_type specifies the type of the frame:
show_frame equal to 1 specifies that this frame should be immediately output once decoded. show_frame equal to 0 specifies that this frame should not be immediately output. (It may be output later if a later uncompressed header uses show_existing_frame equal to 1).
showable_frame equal to 1 specifies that the frame may be output using the show_existing_frame mechanism.
showable_frame equal to 0 specifies that this frame will not be output using the show_existing_frame mechanism.
coded_denom_x is used to compute the amount of horizontal upscaling.
coded_denom_y is used to compute the amount of vertical upscaling.
SuperresDenomX is the denominator of a fraction that specifies the ratio between the superblock width before and after horizontal upscaling. The numerator of this fraction is equal to the constant SUPERRES_NUM.
SuperresDenomY is the denominator of a fraction that specifies the ratio between the superblock width before and after vertical upscaling. The numerator of this fraction is equal to the constant SUPERRES_NUM.

In the same or another example, the above residual frame and its corresponding frame header may be identified by signaling a flag or indicator in one or more OBU data, instead of defining one or more OBU type.

In the same or another example, the above residual frame and its corresponding frame header may be associated with their primary frame and frame headers by signaling the same POC, frame_id and/or display_order, instead of defining a frame unit with new OBU types or signaling an additional syntax element in OBU.

In the same or another example, to separate a residual frame OBU and its residual frame header from their associated primary frame and frame header, different layer_id values are assigned or derived between the residual frame and its primary frame.

In the same or another example, the boundary of a frame unit or a group of one or more frame units, one or more associated frame unit headers, one or more associated residual frame units and one or more associated residual frame unit headers is identified by signaling a delimiter unit (e.g., OBU_TEMPORAL_DELIMITER).

In the same or another example, a group of one or more frame units, one or more associated frame unit headers, one or more associated residual frame units and one or more associated residual frame unit headers is implicitly identified by a predefined rule based on encoding/decoding order of OBUs, without explicit signaling of OBU type or additional syntax elements.

In the same or another example, the low resolution frame and high-resolution residual frame may be decoded independently. A decoder may then decode the low resolution frame in parallel to the high-resolution residual frame. In another example, the presence of a residual frame may be signaled in the bit-stream prior to the residual frame header or residual frame. The decoder may receive the flag, locate the residual frame header or residual frame data in the bit-stream, and decode the residual frame in parallel with the low resolution frame. In another example, the presence and location of the residual frame may be signaled in the bit-stream prior to the residual frame header or residual frame. The decoder may receive the flag, locate the residual frame header or residual frame data in the bit-stream, and decode the residual frame in parallel with the low resolution frame.

In the same or another example, the high-resolution residual frame uses different transforms than in the low-resolution frame. In an example, the high-resolution residual frame is restricted to use a subset of the transforms in the low resolution. In another example, the high-resolution residual frame is restricted to transform with small spatial dimensions. For example, the high-resolution residual frame is restricted to use transforms with dimensions smaller than 16. In alternative examples the dimension is another number—such as 4, 8, or 32.

In an example, the motion compensated prediction may be efficiently performed by employing an affine model. With the selected affine model, the pixels are transformed to form the affine projection.

FIG. 24 is a diagram illustrating a calculation 2400 of affine parameters without a super-resolution scaling factor according to some examples.

In certain standards (e.g., AV1), the affine motion compensation is disabled when the reference picture resolution is different from the currently coded picture resolution. As a result, the scaling factor between the reference picture and the current picture is not reflected into the calculation or derivation of affine model parameters. FIG. 24 (example of the calculation of affine parameters without super-resolution scaling factor) shows an example of the affine model without reflection of super-resolution scaling factor. In certain examples, disabling affine motion compensation is not ideal and decreases the coding efficiency of the affine process when super-resolution is enabled.

FIG. 25 is a diagram illustrating a calculation 2500 of affine parameters with a super-resolution scaling factor according to some examples.

In certain examples, affine motion compensation is allowed and can be enabled when the reference picture resolution is different from the current picture resolution and super-resolution is enabled. In certain examples, the horizontal and vertical scaling factors of the 2D super-resolution are reflected to the calculation of affine parameters. The offset values of motion compensated prediction with the affine model parameters are scaled according to the super-resolution scaling factors. FIG. 25 (example of the calculation of affine parameters with super-resolution scaling factor) shows an example of the affine model with super-resolution scaling factor. In this example, s1 and s2 indicate the horizontal and vertical affine scaling parameters derived from one or more super-resolution scaling factor, respectively.

Figure 26:
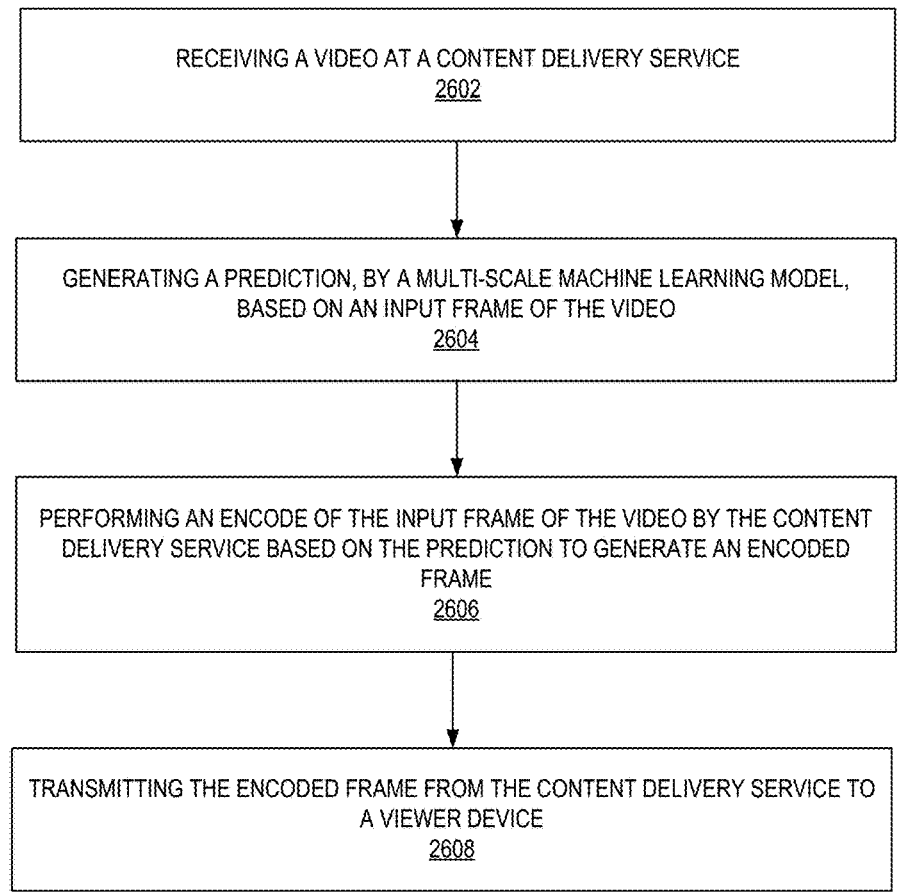
FIG. 26 is a flow diagram illustrating operations of a method of using a multi-scale machine learning model according to some examples.

FIG. 26 is a flow diagram illustrating operations 2600 of a method of using a multi-scale machine learning model according to some examples. Some or all of the operations 2600 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some examples, one or more (or all) of the operations 2600 are performed by a device (e.g., device 3100) and/or content delivery system 102 (e.g., implemented in a provider network) of the other figures.

The operations 2600 include, at block 2602, receiving a video at a content delivery service. The operations 2600 include, at block 2604, generating a prediction, by a multi-scale machine learning model, based on an input frame of the video. The operations 2600 include, at block 2606, performing an encode of the input frame of the video by the content delivery service based on the prediction to generate an encoded frame. The operations 2600 include, at block 2608, transmitting the encoded frame from the content delivery service to a viewer device.

Figure 27:
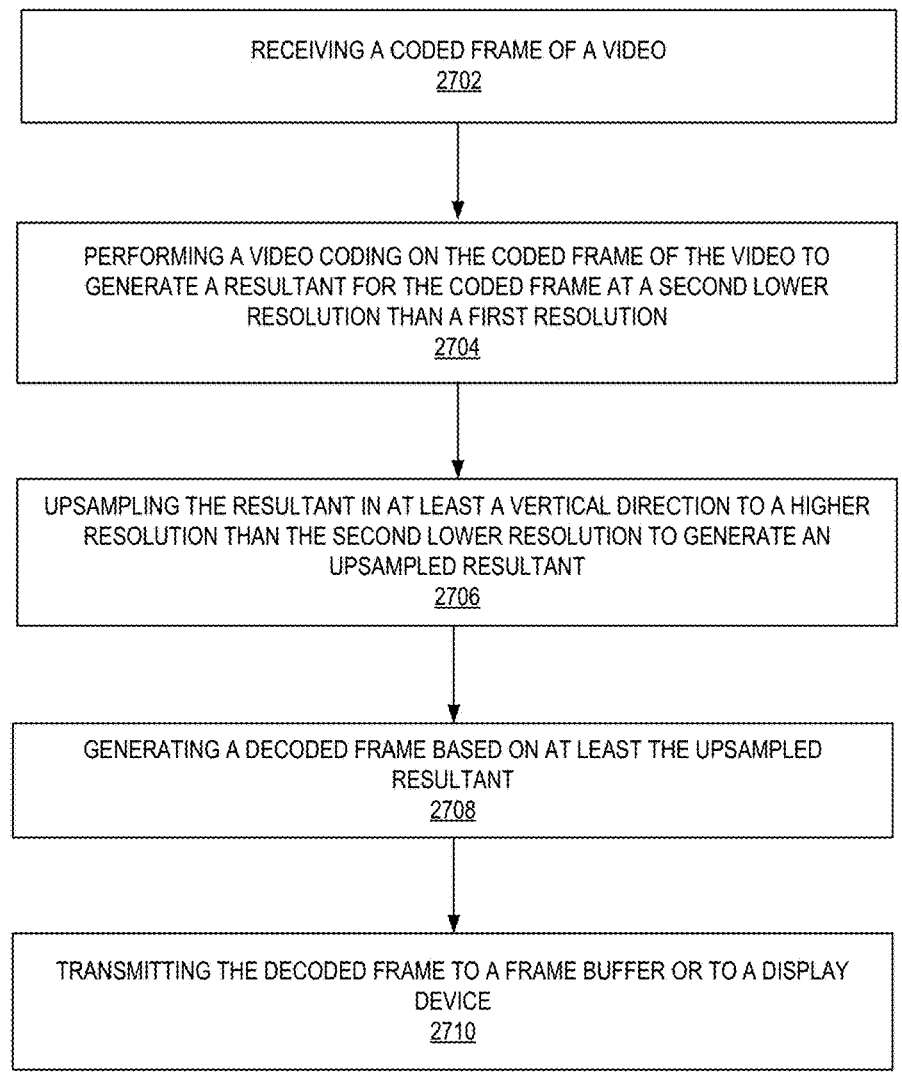
FIG. 27 is a flow diagram illustrating operations of a method of generating a decoded frame according to some examples.

FIG. 27 is a flow diagram illustrating operations of a method of generating a decoded frame according to some examples. Some or all of the operations 2700 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some examples, one or more (or all) of the operations 2700 are performed by a device (e.g., device 3100) and/or content delivery system 102 (e.g., implemented in a provider network) of the other figures.

The operations 2700 include, at block 2702, receiving a coded frame of a video. The operations 2700 further include, at block 2704, performing a video coding on the coded frame of the video to generate a resultant for the coded frame at a second lower resolution than a first resolution. The operations 2700 further include, at block 2706, upsampling the resultant in at least a vertical direction to a higher resolution (e.g., to the first resolution) than the second lower resolution to generate an upsampled resultant. The operations 2700 further include, at block 2708, generating a decoded frame based on at least the upsampled resultant (e.g., and also based on the motion vectors and/or other values at the second lower resolution). The operations 2700 further include, at block 2710, transmitting the decoded frame to a frame buffer or to a display device.

Exemplary environments, systems, etc. that the above may be used in are detailed below.

At least some examples of the disclosed technologies can be described in view of the following examples:

Example 1. A computer-implemented method comprising:
receiving a video at a content delivery service;
generating a prediction, by a multi-scale machine learning model, based on an input frame of the video;
performing an encode of the input frame of the video by the content delivery service based on the prediction to generate an encoded frame; and
transmitting the encoded frame from the content delivery service to a viewer device.

Example 2. The computer-implemented method of example 1, wherein the generating the prediction, by the multi-scale machine learning model, is within a prediction loop of a video codec.

Example 3. The computer-implemented method of example 1, wherein the generating the prediction, by the multi-scale machine learning model, is within a post-processor service after a decoder.

Example 4. The computer-implemented method of example 1, wherein the generating the prediction, by the multi-scale machine learning model, is based on the input frame and a residual value.

Example 5. The computer-implemented method of example 4, further comprising:
generating quantized coefficients for the input frame;
generating inverse quantized coefficients from the quantized coefficients; and
determining the residual value based on the inverse quantized coefficients.

Example 6. The computer-implemented method of example 1, wherein the generating the prediction replaces a deblocking and constrained directional enhancement filter of a video codec.

Example 7. The computer-implemented method of example 1, wherein the generating the prediction, by the multi-scale machine learning model, is based on an inverse transform of the input frame.

Example 8. A computer-implemented method comprising:
receiving a video at a content delivery service;
downsampling a frame of the video from a first resolution to a second lower resolution in a vertical direction and a horizontal direction;
performing an encode on the frame of the video by the content delivery service that coverts the frame from a pixel domain to a transform (e.g., frequency) domain and back to the pixel domain to generate a resultant for the frame at the second lower resolution;
upsampling the resultant in the vertical direction and the horizontal direction to a higher resolution than the second lower resolution to generate an upsampled resultant;
performing an entropy encode of the frame based on at least the upsampled resultant to generate a coded frame; and
transmitting the coded frame from the content delivery service to a decoder (e.g., of a viewer device).

Example 9. The computer-implemented method of example 8, further comprising:
generating a reference frame for the frame based on the upsampled resultant;
storing the reference frame in a frame buffer; and
storing a corresponding decoded motion vector at the second lower resolution for the frame in the frame buffer.

Example 10. The computer-implemented method of example 8, wherein the upsampling comprises generating the upsampled resultant by a machine learning model. In certain examples, the upsampled resultant is generated by performing machine learning processing on an output from the upsampling, and an output of the machine learning model is the upsampled resultant generated by the machine learning model.

Example 11. A computer-implemented method comprising:

receiving a coded frame of a video;

performing a video coding on the coded frame of the video to generate a resultant for the coded frame at a second lower resolution than a first resolution;

upsampling the resultant in at least a vertical direction to a higher resolution than the second lower resolution to generate an upsampled resultant;

generating a decoded frame based on at least the upsampled resultant; and transmitting the decoded frame to a frame buffer or to a display device.

Example 12. The computer-implemented method of example 11, wherein the transmitting comprises transmitting the decoded frame to the frame buffer, and the computer-implemented method further comprises storing a corresponding decoded motion vector at the second lower resolution for the coded frame in the frame buffer.

Example 13. The computer-implemented method of example 12, wherein the frame buffer includes the decoded frame at the higher resolution and does not include a lower resolution version of the decoded frame.

Example 14. The computer-implemented method of example 11, wherein the upsampling comprises generating the upsampled resultant by a machine learning model.

Example 15. The computer-implemented method of example 14, wherein the generating the decoded frame comprises performing a residual operation based on the upsampled resultant at the higher resolution to generate the decoded frame.

Example 16. The computer-implemented method of example 11, wherein the generating the decoded frame comprises performing a residual operation based on the upsampled resultant at the higher resolution to generate the decoded frame.

Example 17. The computer-implemented method of example 11, wherein a viewer device comprises a decoder and the display device, and the upsampling the resultant occurs within a postprocessing operation of the decoder.

Example 18. The computer-implemented method of example 17, wherein the postprocessing operation comprises the upsampling in at least the vertical direction and a loop restoration operation.

Example 19. The computer-implemented method of example 18, wherein the postprocessing operation further comprises performing a residual operation based on the upsampled resultant at the higher resolution to generate the decoded frame.

Example 20. The computer-implemented method of example 11, wherein the upsampling the resultant in the vertical direction to the higher resolution occurs within a super-resolution mode of a decoder.

Example 21. The computer-implemented method of example 11, wherein a header for the video comprises a super-resolution scaling parameter for the vertical direction.

Example 22. An apparatus comprising:
a coupling to a display; and
a video decoder to:
 receive a coded frame of a video,
 perform a video coding on the coded frame of the video to generate a resultant for the coded frame at a second lower resolution than a first resolution,
 upsample the resultant in at least a vertical direction to a higher resolution than the second lower resolution to generate an upsampled resultant,
 generate a decoded frame based on the upsampled resultant, and
 transmit the decoded frame to a frame buffer or to the display.

Example 23. The apparatus of example 22, wherein the video decoder is to transmit the decoded frame to the frame buffer, and is further to store a corresponding decoded motion vector at the second lower resolution for the coded frame in the frame buffer.

Example 24. The apparatus of example 23, wherein the frame buffer includes the decoded frame at the higher resolution and the video decoder is not to include a lower resolution version of the decoded frame in the frame buffer.

Example 25. The apparatus of example 22, wherein the video decoder is to generate the upsampled resultant by a machine learning model.

Example 26. The apparatus of example 22, wherein the video decoder is to upsample the resultant in at least the vertical direction to the higher resolution when the video decoder is in a super-resolution mode.

Example 27. The apparatus of example 22, wherein the video decoder is further to read a header for the video that comprises a super-resolution scaling parameter for the vertical direction.

Figure 28:
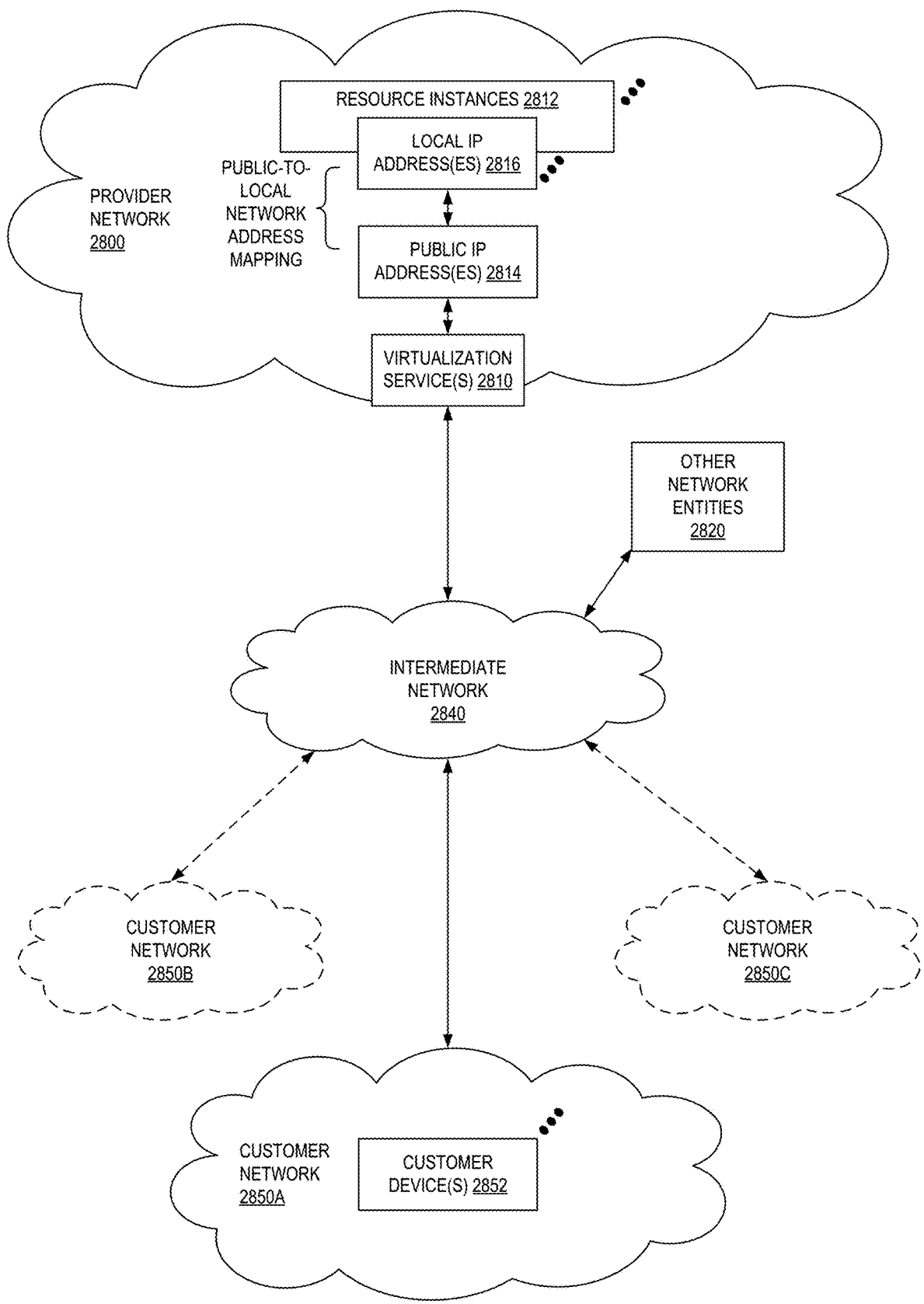
FIG. 28 illustrates an example provider network environment according to some examples.

FIG. 28 illustrates an example provider network (or "service provider system") environment according to some examples. A provider network 2800 may provide resource virtualization to customers via one or more virtualization services 2810 that allow customers to purchase, rent, or otherwise obtain instances 2812 of virtualized resources, including but not limited to computation and storage resources, implemented on devices within the provider network or networks in one or more data centers. Local Internet Protocol (IP) addresses 2816 may be associated with the resource instances 2812; the local IP addresses are the internal network addresses of the resource instances 2812 on the provider network 2800. In some examples, the provider network 2800 may also provide public IP addresses 2814 and/or public IP address ranges (e.g., Internet Protocol version 4 (IPv4) or Internet Protocol version 6 (IPv6) addresses) that customers may obtain from the provider 2800.

Conventionally, the provider network 2800, via the virtualization services 2810, may allow a customer of the service provider (e.g., a customer that operates one or more client networks 2850A-2850C including one or more customer device(s) 2852) to dynamically associate at least some public IP addresses 2814 assigned or allocated to the customer with particular resource instances 2812 assigned to the customer. The provider network 2800 may also allow the customer to remap a public IP address 2814, previously mapped to one virtualized computing resource instance 2812 allocated to the customer, to another virtualized computing resource instance 2812 that is also allocated to the customer. Using the virtualized computing resource instances 2812 and public IP addresses 2814 provided by the service provider, a customer of the service provider such as the operator of customer network(s) 2850A-2850C may for example, implement customer-specific applications and present the customer's applications on an intermediate network 2840, such as the Internet. Other network entities 2820 on the intermediate network 2840 may then generate traffic to a destination public IP address 2814 published by the customer network(s) 2850A-2850C; the traffic is routed to the service provider data center, and at the data center is routed, via a network substrate, to the local IP address 2816 of the virtualized computing resource instance 2812 currently mapped to the destination public IP address 2814. Similarly, response traffic from the virtualized computing resource instance 2812 may be routed via the network substrate back onto the intermediate network 2840 to the source entity 2820.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some examples, the mapping of a standard IP address to a local IP address of a resource instance is the default launch configuration for all resource instance types.

At least some public IP addresses may be allocated to or obtained by customers of the provider network 2800; a customer may then assign their allocated public IP addresses to particular resource instances allocated to the customer. These public IP addresses may be referred to as customer public IP addresses, or simply customer IP addresses. Instead of being assigned by the provider network 2800 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 29:
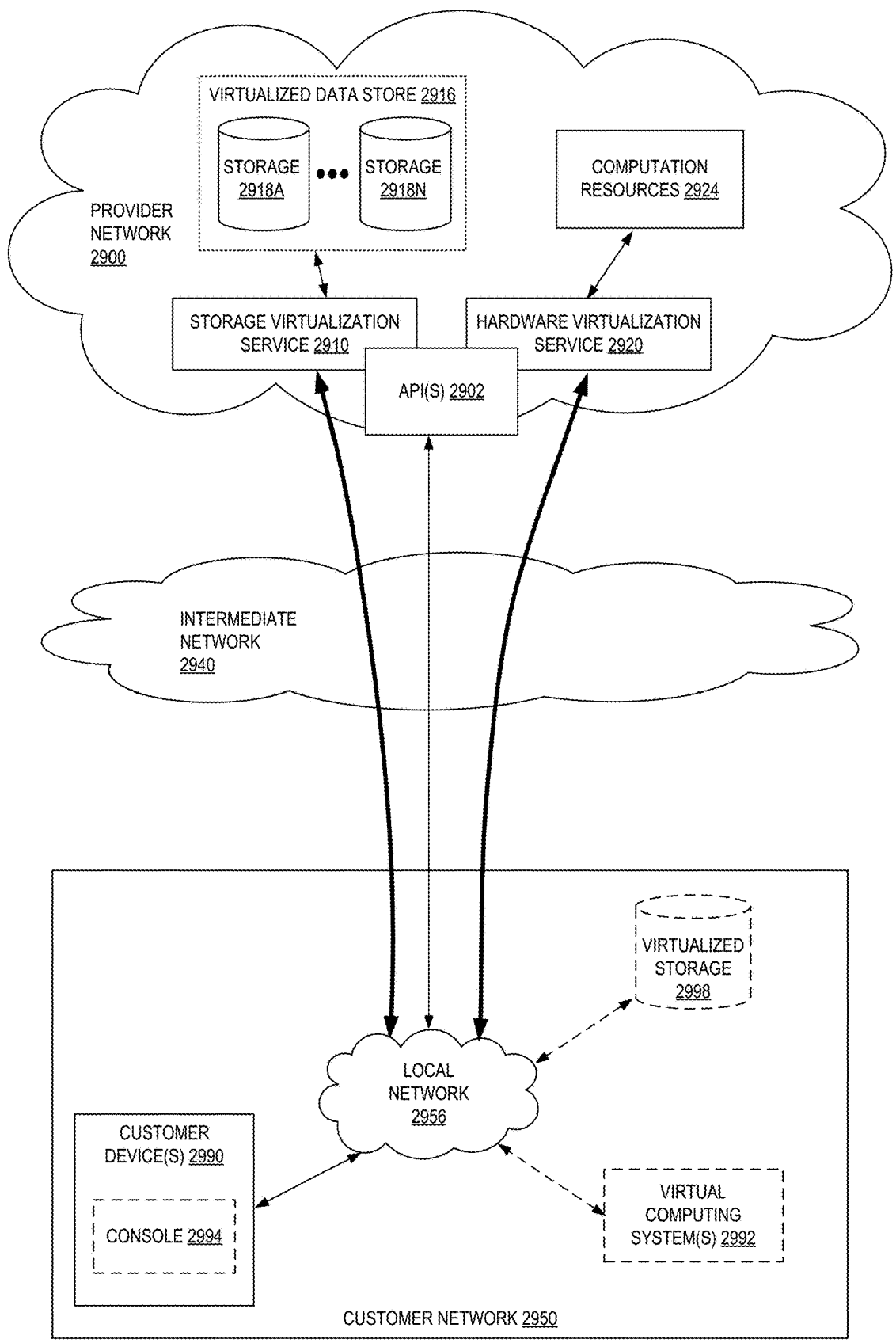
FIG. 29 is a block diagram of an example provider network that provides a storage service and a hardware virtualization service to customers according to some examples.

FIG. 29 is a block diagram of an example provider network that provides a storage service and a hardware virtualization service to customers, according to some examples. Hardware virtualization service 2920 provides multiple computation resources 2924 (e.g., VMs) to customers. The computation resources 2924 may for example, be rented or leased to customers of the provider network 2900 (e.g., to a customer that implements customer network 2950). Each computation resource 2924 may be provided with one or more local IP addresses. Provider network 2900 may be configured to route packets from the local IP addresses of the computation resources 2924 to public Internet destinations, and from public Internet sources to the local IP addresses of computation resources 2924.

Provider network 2900 may provide a customer network 2950, for example coupled to intermediate network 2940 via local network 2956, the ability to implement virtual computing systems 2992 via hardware virtualization service 2920 coupled to intermediate network 2940 and to provider network 2900. In some examples, hardware virtualization service 2920 may provide one or more APIs 2902, for example a web services interface, via which a customer network 2950 may access functionality provided by the hardware virtualization service 2920, for example via a console 2994 (e.g., a web-based application, standalone application, mobile application, etc.). In some examples, at the provider network 2900, each virtual computing system 2992 at customer network 2950 may correspond to a computation resource 2924 that is leased, rented, or otherwise provided to customer network 2950.

From an instance of a virtual computing system 2992 and/or another customer device 2990 (e.g., via console 2994), the customer may access the functionality of storage service 2910, for example via one or more APIs 2902, to access data from and store data to storage resources 2918A-2918N of a virtual data store 2916 (e.g., a folder or "bucket", a virtualized volume, a database, etc.) provided by the provider network 2900. In some examples, a virtualized data store gateway (not shown) may be provided at the customer network 2950 that may locally cache at least some data, for example frequently-accessed or critical data, and that may communicate with storage service 2910 via one or more communications channels to upload new or modified data from a local cache so that the primary store of data (virtualized data store 2916) is maintained. In some examples, a user, via a virtual computing system 2992 and/or on another customer device 2990, may mount and access virtual data store 2916 volumes via storage service 2910 acting as a storage virtualization service, and these volumes may appear to the user as local (virtualized) storage 2998.

While not shown in FIG. 29, the virtualization service(s) may also be accessed from resource instances within the provider network 2900 via API(s) 2902. For example, a customer, appliance service provider, or other entity may access a virtualization service from within a respective virtual network on the provider network 2900 via an API 2902 to request allocation of one or more resource instances within the virtual network or within another virtual network.

Illustrative System

Figure 30:
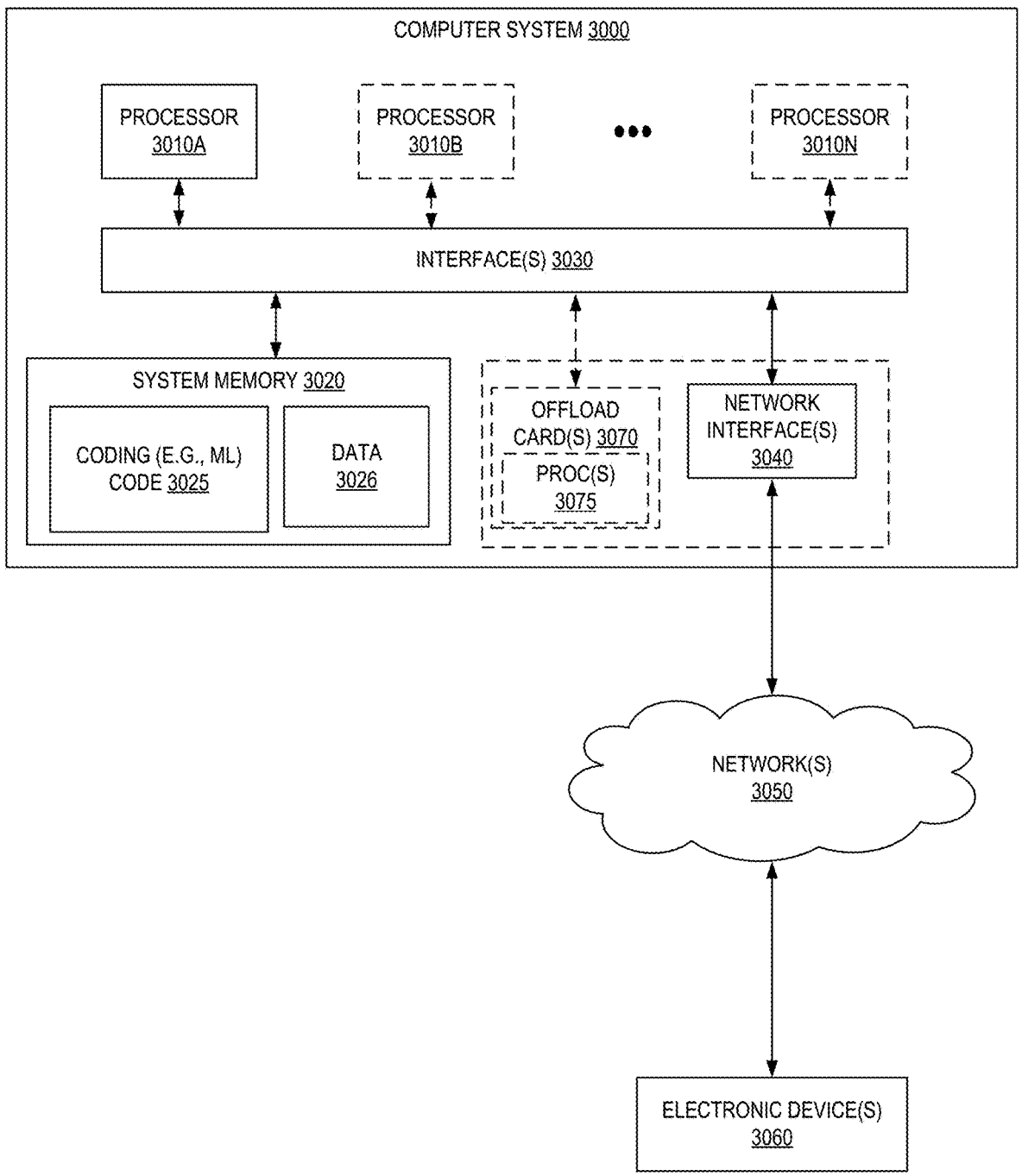
FIG. 30 is a block diagram illustrating an example computer system that may be used in some examples.

In some examples, a system that implements a portion or all of the techniques for content indexing as described herein may include a general-purpose computer system that includes or is configured to access one or more computer-accessible media, such as computer system 3000 illustrated in FIG. 30. In the illustrated example, computer system 3000 includes one or more processors 3010 coupled to a system memory 3020 via an input/output (I/O) interface 3030. Computer system 3000 further includes a network interface 3040 coupled to I/O interface 3030. While FIG. 30 shows computer system 3000 as a single computing device, in various examples a computer system 3000 may include one computing device or any number of computing devices configured to work together as a single computer system 3000.

In various examples, computer system 3000 may be a uniprocessor system including one processor 3010, or a multiprocessor system including several processors 3010 (e.g., two, four, eight, or another suitable number). Processors 3010 may be any suitable processors capable of executing instructions. For example, in various examples, processors 3010 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 3010 may commonly, but not necessarily, implement the same ISA.

System memory 3020 may store instructions and data accessible by processor(s) 3010. In various examples, system memory 3020 may be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above are shown stored within system memory 3020 as coding (e.g., ML) code 3025 (e.g., executable to implement, in whole or in part, the ML model(s) or other operations discussed herein) and data 3026.

In one example, I/O interface 3030 may be configured to coordinate I/O traffic between processor 3010, system memory 3020, and any peripheral devices in the device, including network interface 3040 or other peripheral interfaces. In some examples, I/O interface 3030 may perform any necessary protocol, timing, or other data transformations to convert data signals from one component (e.g., system memory 3020) into a format suitable for use by another component (e.g., processor 3010). In some examples, I/O interface 3030 may include support for devices attached through various types of peripheral buses, such as a variant of the Peripheral Component Interconnect (PCI) bus standard or the Universal Serial Bus (USB) standard, for example. In some examples, the function of I/O interface 3030 may be split into two or more separate components, such as a north bridge and a south bridge, for example. Also, in some examples some or all of the functionality of I/O interface 3030, such as an interface to system memory 3020, may be incorporated directly into processor 3010.

Network interface 3040 may be configured to allow data to be exchanged between computer system 3000 and other devices 3060 attached to a network or networks 3050, such as other computer systems or devices as illustrated in FIG. 1, for example. In various examples, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks (SANs) such as Fibre Channel SANs, or via I/O any other suitable type of network and/or protocol.

In some examples, a computer system 3000 includes one or more offload cards 3070 (including one or more processors 3075, and possibly including the one or more network interfaces 3040) that are connected using an I/O interface 3030 (e.g., a bus implementing a version of the Peripheral Component Interconnect-Express (PCI-E) standard, or another interconnect such as a QuickPath interconnect (QPI) or UltraPath interconnect (UPI)). For example, in some examples the computer system 3000 may act as a host electronic device (e.g., operating as part of a hardware virtualization service) that hosts compute instances, and the one or more offload cards 3070 execute a virtualization manager that can manage compute instances that execute on the host electronic device. As an example, in some examples the offload card(s) 3070 can perform compute instance management operations such as pausing and/or un-pausing compute instances, launching and/or terminating compute instances, performing memory transfer/copying operations, etc. These management operations may in some examples, be performed by the offload card(s) 3070 in coordination with a hypervisor (e.g., upon a request from a hypervisor) that is executed by the other processors 3010A-3010N of the computer system 3000. However, in some examples the virtualization manager implemented by the offload card(s) 3070 can accommodate requests from other entities (e.g., from compute instances themselves), and may not coordinate with (or service) any separate hypervisor.

In some examples, system memory 3020 may be one example of a computer-accessible medium configured to store program instructions and data as described above. However, in other examples, program instructions and/or data may be received, sent, or stored upon different types of computer-accessible media. Generally speaking, a computer-accessible medium may include non-transitory storage media or memory media such as magnetic or optical media, e.g., disk or DVD/CD coupled to computer system 3000 via I/O interface 3030. A non-transitory computer-accessible storage medium may also include any volatile or non-volatile media such as RAM (e.g., SDRAM, double data rate (DDR) SDRAM, SRAM, etc.), read only memory (ROM), etc., that may be included in some examples of computer system 3000 as system memory 3020 or another type of memory. Further, a computer-accessible medium may include transmission media or signals such as electrical, electromagnetic, or digital signals, conveyed via a communication medium such as a network and/or a wireless link, such as may be implemented via network interface 3040.

Figure 31:
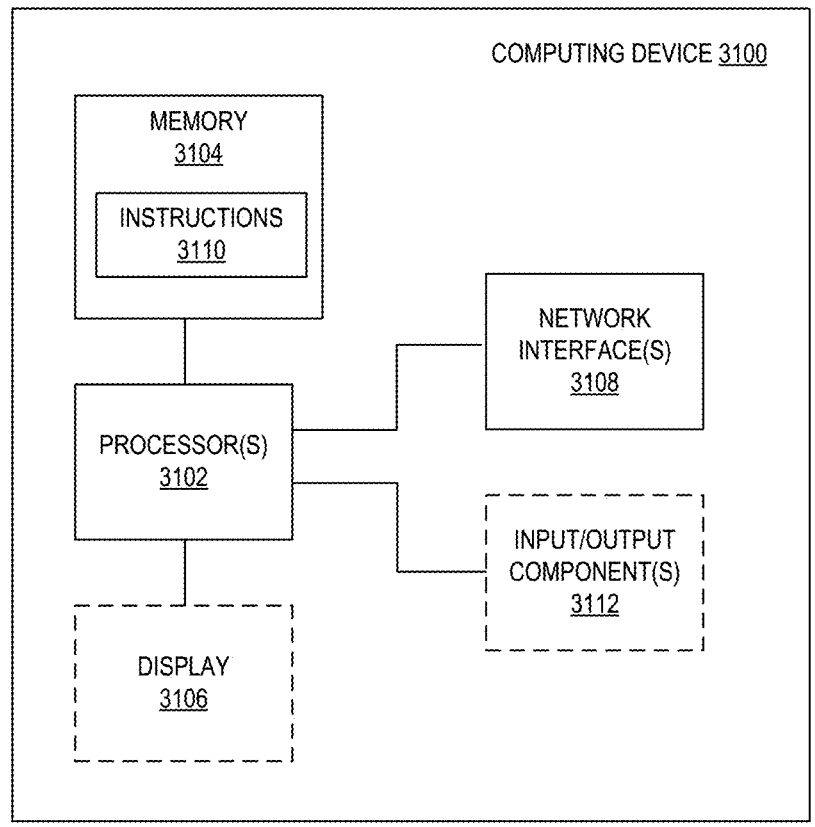
FIG. 31 illustrates a logical arrangement of a set of general components of an exemplary computing device that can be utilized in accordance with various examples.

FIG. 31 illustrates a logical arrangement of a set of general components of an example computing device 3100. Generally, a computing device 3100 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 3102 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 3104) to store code (for example, instructions 3110, e.g., which implement a content delivery service as disclosed herein), and a set of one or more wired or wireless network interfaces 3108 allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media (e.g., memory 3104) of a given electronic device typically stores code (e.g., instructions 3110) for execution on the set of one or more processors 3102 of that electronic device. One or more parts of various examples may be implemented using different combinations of software, firmware, and/or hardware.

A computing device 3100 can include some type of display element 3106, such as a touch screen or liquid crystal display (LCD), although many devices such as portable media players might convey information via other means, such as through audio speakers, and other types of devices such as server end stations may not have a display element 3106 at all. As discussed, some computing devices used in some examples include at least one input and/or output component(s) 3112 able to receive input from a user. This input component can include, for example, a push button, touch pad, touch screen, wheel, joystick, keyboard, mouse, keypad, or any other such device or element whereby a user is able to input a command to the device. In some examples, however, such a device might be controlled through a combination of visual and/or audio commands and utilize a microphone, camera, sensor, etc., such that a user can control the device without having to be in physical contact with the device.

Figure 32:
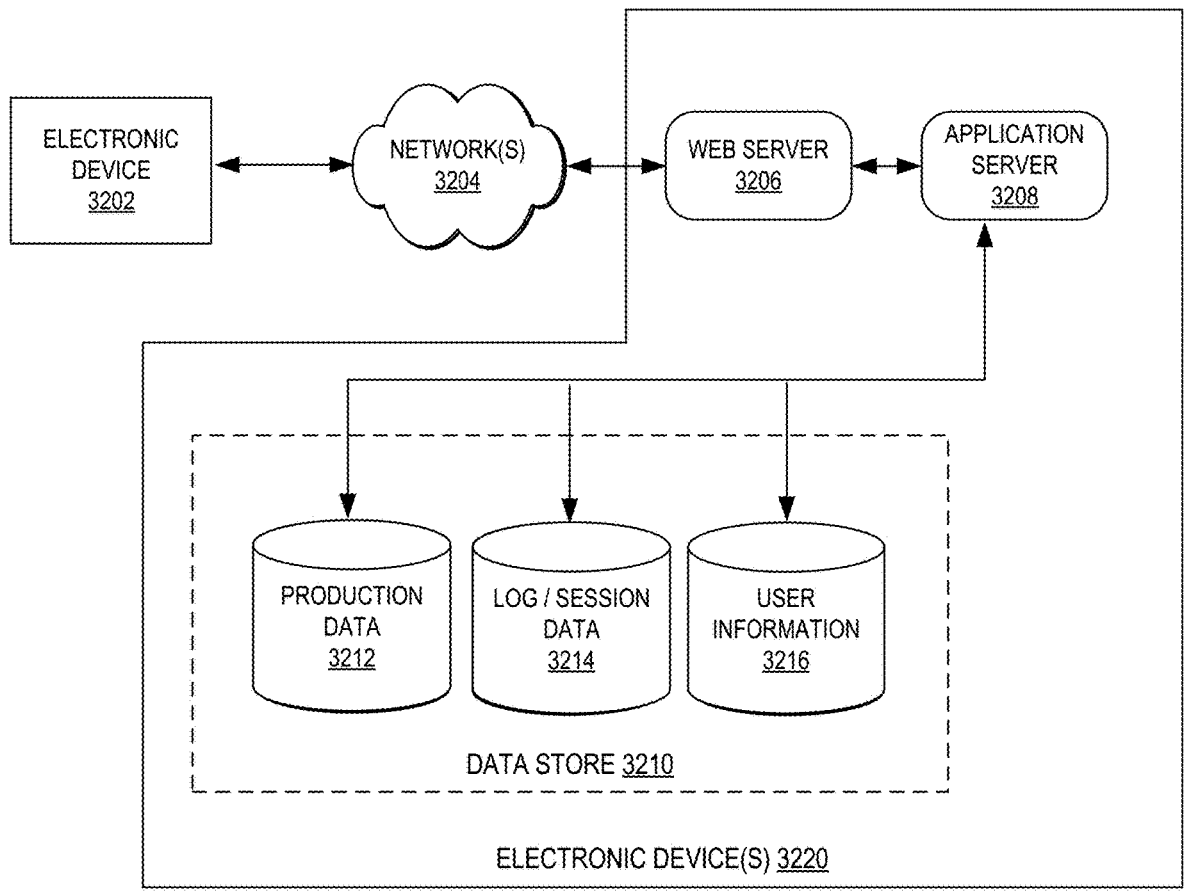
FIG. 32 illustrates an example of an environment for implementing aspects in accordance with various examples.

As discussed, different approaches can be implemented in various environments in accordance with the described examples. For example, FIG. 32 illustrates an example of an environment 3200 for implementing aspects in accordance with various examples. For example, in some examples messages are HyperText Transfer Protocol (HTTP) requests that are received by a web server (e.g., web server 3206), and the users, via electronic devices, may interact with the provider network via a web portal provided via the web server 3206 and application server 3208. As will be appreciated, although a web-based environment is used for purposes of explanation, different environments may be used, as appropriate, to implement various examples. The system includes an electronic client device 3202, which may also be referred to as a client device and can be any appropriate device operable to send and receive requests, messages, or information over an appropriate network 3204 and convey information back to a user of the device 3202. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 3204 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 3204 includes the Internet, as the environment includes a web server 3206 for receiving requests and serving content in response thereto, although for other networks an alternative device serving a similar purpose could be used, as would be apparent to one of ordinary skill in the art.

The illustrative environment includes at least one application server 3208 and a data store 3210. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices and data storage media, in any standard, distributed or clustered environment. The application server 3208 can include any appropriate hardware and software for integrating with the data store 3210 as needed to execute aspects of one or more applications for the client device 3202 and handling a majority of the data access and business logic for an application. The application server 3208 provides access control services in cooperation with the data store 3210 and is able to generate content such as text, graphics, audio, video, etc., to be transferred to the client device 3202, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 3202 and the application server 3208, can be handled by the web server 3206. It should be understood that the web server 3206 and application server 3208 are not required and are merely example components, as structured code discussed herein can be executed on any appropriate device or host machine as discussed elsewhere herein.

The data store 3210 can include several separate data tables, databases, or other data storage mechanisms and media for storing data relating to a particular aspect. For example, the data store illustrated includes mechanisms for storing production data 3212 and user information 3216, which can be used to serve content for the production side. The data store 3210 also is shown to include a mechanism for storing log or session data 3214. It should be understood that there can be many other aspects that may need to be stored in the data store, such as page image information and access rights information, which can be stored in any of the above listed mechanisms as appropriate or in additional mechanisms in the data store 3210. The data store 3210 is operable, through logic associated therewith, to receive instructions from the application server 3208 and obtain, update, or otherwise process data in response thereto. In one example, a user might submit a search request for a certain type of item. In this case, the data store 3210 might access the user information 3216 to verify the identity of the user and can access a production data 3212 to obtain information about items of that type. The information can then be returned to the user, such as in a listing of results on a web page that the user is able to view via a browser on the user device 3202. Information for a particular item of interest can be viewed in a dedicated page or window of the browser.

The web server 3206, application server 3208, and/or data store 3210 may be implemented by one or more electronic devices 3220, which can also be referred to as electronic server devices or server end stations, and may or may not be located in different geographic locations. Each of the one or more electronic devices 3220 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one example is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 32. Thus, the depiction of the environment 3200 in FIG. 32 should be taken as being illustrative in nature and not limiting to the scope of the disclosure.

Various examples discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most examples utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of examples, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, services, or other elements located within at least one working memory device, including an operating system and application programs, such as a client application or web browser. It should be appreciated that alternate examples may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program code, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the example being described.

Bracketed text and blocks with dashed borders (e.g., large dashes, small dashes, dot-dash, and dots) may be used herein to illustrate optional operations that add additional features to some examples. However, such notation should not be taken to mean that these are the only options or optional operations, and/or that blocks with solid borders are not optional in certain examples.

Reference numerals with suffix letters (e.g., 2918A-2918N) may be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various examples.

References to "one example," "an example," "certain examples," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given example requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
    receiving a video at a content delivery service;
    downsampling a frame of the video from a first resolution to a second lower resolution in a vertical direction and a horizontal direction;
    performing a video coding on the frame of the video by the content delivery service that coverts the frame from a pixel domain to a transform domain and back to the pixel domain to generate a resultant for the frame at the second lower resolution;
    upsampling the resultant in the vertical direction and the horizontal direction to a higher resolution than the second lower resolution to generate an upsampled resultant;
    performing an entropy encode of the frame based on at least the upsampled resultant to generate a coded frame;
    transmitting the coded frame from the content delivery service to a decoder;
    generating a reference frame at the higher resolution for the frame based on the upsampled resultant;
    storing the reference frame at the higher resolution in a frame buffer; and
    storing a corresponding decoded motion vector at the second lower resolution for the frame in the frame buffer.

2. The computer-implemented method of claim 1, wherein
    the storing the reference frame at the higher resolution and
    the storing the corresponding decoded motion vector at the second lower resolution for the frame are in a single frame unit in the frame buffer.

3. The computer-implemented method of claim 1, wherein the upsampling comprises generating the upsampled resultant by a machine learning model.

4. A computer-implemented method comprising:
    receiving a coded frame of a video;
    performing a video coding on the coded frame of the video to generate a resultant for the coded frame at a second lower resolution than a first resolution;
    upsampling the resultant in at least a vertical direction to a higher resolution than the second lower resolution to generate an upsampled resultant;
    generating a decoded frame at the higher resolution based on at least the upsampled resultant;
    causing a store of the decoded frame at the higher resolution in a frame buffer; and
    causing a store of a corresponding decoded motion vector at the second lower resolution for the coded frame in the frame buffer.

5. The computer-implemented method of claim 4, wherein the causing the store of the decoded frame at the higher resolution and the causing the store of the corresponding decoded motion vector at the second lower resolution for the coded frame are in a single frame unit in the frame buffer.

6. The computer-implemented method of claim 4, wherein the frame buffer does not include a corresponding decoded motion vector at the higher resolution for the coded frame.

7. The computer-implemented method of claim 4, wherein the upsampling comprises generating the upsampled resultant by a machine learning model.

8. The computer-implemented method of claim 7, wherein the generating the decoded frame comprises performing a residual operation based on the upsampled resultant at the higher resolution to generate the decoded frame.

9. The computer-implemented method of claim 4, wherein the generating the decoded frame comprises performing a residual operation based on the upsampled resultant at the higher resolution to generate the decoded frame.

10. The computer-implemented method of claim 4, wherein a viewer device comprises a decoder including the frame buffer, and the upsampling the resultant occurs within a postprocessing operation of the decoder.

11. The computer-implemented method of claim 10, wherein the postprocessing operation comprises the upsampling in at least the vertical direction and a loop restoration operation.

12. The computer-implemented method of claim 11, wherein the postprocessing operation further comprises performing a residual operation based on the upsampled resultant at the higher resolution to generate the decoded frame.

13. The computer-implemented method of claim 4, wherein the upsampling the resultant in at least the vertical direction to the higher resolution occurs within a decoder in a super-resolution mode.

14. The computer-implemented method of claim 4, wherein a header for the video comprises a super-resolution scaling parameter for the vertical direction.

15. An apparatus comprising:
a coupling to a display; and
a video decoder to:
  receive a coded frame of a video,
  perform a video coding on the coded frame of the video to generate a resultant for the coded frame at a second lower resolution than a first resolution,
  upsample the resultant in at least a vertical direction to a higher resolution than the second lower resolution to generate an upsampled resultant,
  generate a decoded frame at the higher resolution based on the upsampled resultant,
  store the decoded frame at the higher resolution in a frame buffer, and
  store a corresponding decoded motion vector at the second lower resolution for the coded frame in the frame buffer.

16. The apparatus of claim 15, wherein the store of the decoded frame at the higher resolution and the store of the corresponding decoded motion vector at the second lower resolution for the coded frame are in a single frame unit in the frame buffer.

17. The apparatus of claim 16, wherein the frame buffer does not include a corresponding decoded motion vector at the higher resolution for the coded frame.

18. The apparatus of claim 15, wherein the video decoder is to generate the upsampled resultant by a machine learning model.

19. The apparatus of claim 15, wherein the video decoder is to upsample the resultant in at least the vertical direction to the higher resolution when the video decoder is in a super-resolution mode.

20. The apparatus of claim 15, wherein the video decoder is further to read a header for the video that comprises a super-resolution scaling parameter for the vertical direction.

* * * * *